United States Patent [19]

Keefer

[11] Patent Number: 4,968,329
[45] Date of Patent: Nov. 6, 1990

[54] PRESSURE SWING ADSORPTION FOR CONCENTRATION OF A GAS COMPONENT

[76] Inventor: Bowie G. Keefer, 4324 W. 11th Ave., Vancouver, Canada, V6R 2M1

[21] Appl. No.: 252,984

[22] Filed: Oct. 1, 1988

Related U.S. Application Data

[63] Continuation-in-part of Ser. No. 112,111, Oct. 26, 1987, abandoned.

[51] Int. Cl.⁵ .............................................. B01D 53/04
[52] U.S. Cl. ........................................ 55/25; 55/28; 55/58; 55/62; 55/189; 55/208
[58] Field of Search ................ 55/25, 28, 58, 62, 189, 55/208

[56] References Cited

U.S. PATENT DOCUMENTS 4,702,903 10/1987 Keefer .................................. 423/653
4,801,308 1/1989 Keefer ..................................... 55/68

Primary Examiner—Wayne A. Langel

[57] ABSTRACT

Pressure swing adsorption separation of a gas mixture containing a more readily adsorbed component and a less readily adsorbed component is performed to concentrate one of the components as a relatively purified product, within an apparatus which includes an adsorbent bed and cyclically operated variable volume displacement means associated with the adsorbent bed to vary the working pressure of the gas contacting the adsorbent bed. The invention provides means to generate flow over the adsorbent bed and achieve recovery of expansion energy, while enabling large exchanges of fresh feed gas for depleted feed gas during each cycle.

59 Claims, 10 Drawing Sheets

PRESSURE SWING ADSORPTION FOR CONCENTRATION OF A GAS COMPONENT

This application is a continuation-in-part of my copending U.S. patent application 07/112,111, abandoned and also includes some material from my Disclosure Document 183138 filed in the Patent Office on 21 Dec. 1987.

BACKGROUND OF THE INVENTION

1. Field of the Invention

The invention relates to separations conducted in the gas or vapour phase, and particularly to concentration of a desired component as a relatively purified product. In the practice of this invention, it will be desired to concentrate and purify the product with high efficiency, but it will not usually be required to achieve the highest possible recovery of the desired component from the feed stream. The invention applies for example to separation of oxygen or nitrogen from atmospheric air; or to purging of an impurity from a chemical process loop.

2. Prior Art

Gas separation by pressure swing adsorption is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed, and is reduced during alternating intervals of flow in the reverse direction. As the cycle is repeated, the less readily adsorbed component is concentrated in the first direction, while the more readily adsorbed component is concentrated in the reverse direction.

The conventional process for gas separation by pressure swing adsorption uses two or more adsorbent beds with directional valving to control the flow of compressed feed gas over each bed in alternating sequence, while the other bed is purged at low pressure by the reverse flow of a portion of the product gas. This conventional process makes inefficient use of applied compression energy, because of irreversible expansion over the valves while switching beds between higher and lower pressures. Also, the bed is closed at one end while the pressure is changing in response to flow into or out of the other end, and there will be flow at all points of the bed except the closed end owing to gas compressibility and changing adsorbent uptake as the pressure changes. This flow during pressure changing intervals can be detrimental to separation performance.

Some prior inventors have disclosed single bed pressure swing adsorption devices using mechanical cyclic volume displacement means such as pistons to generate cyclic flow and pressure variations in the bed. Examples of such devices with a piston at only one end of the bed include (Broughton) U.S. Pat. No. 3,121,625, (Wilson) U.S. Pat. No. 3,164,454, (Rutan) U.S. Pat. No. 3,236,028, and (Eriksson) U.S. Pat. No. 4,169,715. In each of these devices, the single piston is connected to the feed end of the adsorbent bed; and the resulting cycle will have inferior separation performance owing to lack of provision for a well defined purge step at the lowest pressure of the cycle.

Gardner (U.S. Pat. No. 4,207,084) has disclosed a single bed pressure swing adsorption device in which the adsorbent bed is mounted within a moving piston, with valving so that one side of the piston acts as a compressor. After completing the high pressure portion of its cycle, this device releases its internal pressure over a valve so that expansion energy is dissipated. This invention also has no provision for adequate purge flow when cycle pressure is minimum.

Keller (U.S. Pat. No. 4,354,859) has disclosed and tested a single bed pressure swing adsorption device with mechanical volume displacement means at both ends of the bed, with a specified range of phase angles between the two volume displacement means which are required to have unequal displacement. The cyclic flow and pressure regime is generated entirely by cyclic reciprocation of the volume displacement means at each end of the bed. The feed gas mixture is introduced to an intermediate point between the ends of the adsorbent bed, and a product enriched in the more readily adsorbed component is withdrawn from one end while a product enriched in the less readily adsorbed component is withdrawn from the other end. The Keller device can be effective in approaching substantially complete separation of a two component mixture, so that each component is concentrated into a product stream with high purity and high recovery simultaneously. It will be less effective for applications requiring concentration of only one component and not requiring high recovery of that component, as is often the case in air separation to generate either oxygen or nitrogen as a single product, because effort expended to concentrate the undesired second component will detract from the attainable purity and productivity of the desired product. Operation at high recovery will be inappropriate when the feed gas contains condensible components (such as water vapour in ambient air) which can deactivate the adsorbent (such as molecular sieves used for air separation).

A generalized class of thermally coupled pressure swing adsorption devices is disclosed in my U.S. Pat. No. 4,702,903. These devices use cyclic volume displacement means at each end of the adsorbent bed to generate the cyclic flow regime, and in general have a temperature gradient between the ends of the bed so that the cyclic pressure regime is determined both by the volume changes and by displacement of the gas between zones of different temperature. Gas separation is then combined with thermal energy conversion according to a regenerative thermodynamic cycle related to the Stirling or Ericsson cycles. The gases being separated may be chemically reactive within the apparatus. No means are provided for large exchanges of fresh feed gas for depleted feed gas during each cycle, so these devices may also have difficulties with adsorbent deactivation when the feed gas contains condensible components.

The present application is a continuation of my copending U.S. patent application 07/112,111, and is related to my copending U.S. patent application 06/929,438. The latter patent application is concerned with pressure swing adsorption devices whose adsorbent bed has cyclically varied geometry, so that the gas volume along the flow path through the bed cyclically expands and contracts, in order to compensate for the compressibility of the gas and thus minimize flow while the pressure is changing. In most embodiments of the present invention, the adsorbent bed has a fixed geometry.

SUMMARY OF THE INVENTION

Pressure swing adsorption separation of a feed gas mixture containing a first component and a second component is performed to concentrate the first component in relatively purified product gas, so that the feed gas mixture is separated into a product gas enriched in the first component and a depleted gas mixture enriched in the second component and depleted in the first component. The process of the invention is performed within an apparatus which includes an adsorbent bed of an adsorbent material. One of the first and second components is more readily adsorbed over the adsorbent material than the other component (which is less readily adsorbed) under increase of pressure. The working pressure within the apparatus will be cycled between a first pressure and a second pressure, such that a gas mixture of the first and second components contacting the adsorbent material will be relatively depleted in the first component at the first pressure, and relatively enriched in the first component at the second pressure.

The distinction between more and less readily adsorbed components may be based on equilibrium or kinetic adsorption selectivity, and must be referred (for a given feed gas mixture and adsorbent material) to specific operating conditions including the amplitudes of the first and second pressures, the frequency at which the pressure is cycled, and the temperature of the adsorbent material.

In the example of air separation to concentrate oxygen at room temperature using a zeolite molecular sieve adsorbent such as 5A or 13X, nitrogen is more readily adsorbed than oxygen owing to equilibrium selectivity. As oxygen and nitrogen are first and second components respectively, the second pressure must be higher than the first pressure. In this example, if the first pressure is approximately atmospheric, the second pressure must be greater than atmospheric; but if the second pressure is approximately atmospheric, the first pressure must be subatmospheric.

The apparatus has a working space containing the adsorbent bed. A flow path through the adsorbent bed has first and second ends. The flow path communicates at its first end with the first portion of the working space, and at its second end with the second portion of the working space. The flow path may comprise a multiplicity of substantially parallel channels through the adsorbent material, with each channel providing a portion of the flow path between the first and second portions of the working space, which otherwise have no communication to gas flow. Flow directions in the flow path are defined, with a first direction from the first to second end of the flow path, and a second direction (reverse to the first direction) from the second to first end of the flow path.

The apparatus also has cyclic volume displacement means (such as reciprocating pistons) communicating with the flow path to vary the total volume of the working space, and thus changing the working pressure of the gas contacting the adsorbent bed. A cyclic volume displacement means is associated with the second end of the flow path, and is operated to expand or contract the volume of a second space within the working space. The second space communicates with the second end of the flow path. Another cyclic volume displacement means may be associated with the first end of the flow path, and would then be operated to expand or contract the volume of a first space within the working space and communicating with the first end of the flow path. Other cyclic volume displacement means may also be located at intermediate points of the flow path between the first and second ends, so as to vary the volume of intermediate spaces within the flow path itself.

The apparatus includes feed supply means for introducing the feed gas mixture into the working space and to the first end of the flow path, product delivery means for withdrawing the product gas from adjacent the second end of the flow path, and exhaust means for withdrawing the depleted gas mixture from the working space.

In typical embodiments, the feed supply means includes a feed supply valve for introducing the feed gas mixture to adjacent the first end of the flow path, and means for inducting the feed gas mixture at a feed pressure and for delivering the feed gas mixture to the feed supply valve at substantially the second pressure. The feed supply means may also include means for generating flow in the first direction through the flow path, while the feed supply valve is open and the working pressure is substantially the second pressure. The feed supply means is often a compressor. The feed supply means may include a compressor valved chamber, or compression chamber, whose volume is reciprocated at the same cyclic frequency as the cyclic volume displacement means communicating with the flow path. The compressor valved chamber will be part of the effective working space while the feed supply valve is open, when the flow at the first end of the flow path is in the first direction, and optionally when the working pressure is being changed upward.

The product delivery means typically includes a product delivery valve for withdrawing gas enriched in the first component from adjacent the second end of the flow path, and may also include means for accepting the product gas at a working pressure of the apparatus when the product delivery valve is open, and for delivering the product gas at a delivery pressure. The product delivery means may include means for accepting the product gas from the product delivery valve which is opened when the working pressure is substantially the second pressure, and for generating flow in the flow path in the first direction while the product delivery valve is open.

Likewise, the exhaust means typically includes an exhaust valve for withdrawing the depleted gas mixture (which is depleted in the first component and enriched in the second component) from adjacent the first end of the flow path, and may include means for accepting depleted gas mixture at substantially the first pressure from adjacent the first end of the flow path and for discharging the exhaust gas mixture at a discharge pressure. The exhaust means may be an expander if the first pressure exceeds the discharge pressure, or may be a vacuum pump if the discharge pressure is approximately atmospheric and the first pressure is subatmospheric. The exhaust means may include an exhaust valved chamber whose volume is being reciprocated at the same cyclic frequency as the cyclic volume displacement means communicating with the flow path. The exhaust valved chamber will communicate with the working space through the open exhaust valve when the working pressure is substantially the first pressure, and more generally when there is flow in the second direction in the flow path at its first end.

The apparatus also includes means to exchange depleted gas mixture for feed gas mixture, so as to restrict reintroduction of the depleted gas mixture to the flow path. Thus, means is provided to restrict mixing of depleted gas mixture about to be exhausted with feed gas mixture that has been introduced to the working space and will be introduced to the adsorbent bed at the first end of the flow path. This aspect of the invention is most important, since the above discussed prior inventions using cyclic volume displacement means to change the volume of the working space containing an adsorbent bed (in order to change the working pressure) invariably have a cyclic volume displacement means communicating with the first end of the flow path, in which mixing of depleted gas mixture and feed gas introduced adjacent the first end of the flow path will occur, and large exhanges of the depleted gas mixture for fresh feed gas cannot be achieved while maintaining a desired pressure ratio between first and second absolute pressures.

A process conducted according to the invention includes the cyclically repeated steps of:

(a) introducing the feed gas mixture into the working space and to the first end of the flow path by means of the feed supply valve, (b) changing the volume of the working space by operating the cyclic volume displacement means communicating with the flow path, so as to change the working pressure over the adsorbent material between the first pressure and the second pressure, (c) while the working pressure is substantially at the second pressure, and the gas mixture contacting the adsorbent material is thus relatively enriched in the first component, generating flow of the feed gas mixture into the flow path through the adsorbent bed from the first end of the flow path, so that the gas mixture flows along the flow path in the first direction; and operating the cyclic volume displacement means communicating with the second end of the flow path to expand the second space, so as to store within the second space some gas enriched in the first component that has flowed from the second end of the flow path, (d) withdrawing from the second portion of the working space a portion of the gas enriched in the first component which has flowed out of the adsorbent bed at the second end of the flow path in step (c) above, by means of the product delivery valve, (e) changing the volume of the working space by operating the cyclic volume displacement means, so as to change the working pressure from substantially the second pressure to substantially the first pressure, (f) while the working pressure is substantially at the first pressure, and the gas mixture contacting the adsorbent bed is thus relatively depleted in the first component, operating the cyclic volume displacement means associated with the second end of the flow path so as to contract the second space and thus generate flow along the flow path in a second direction reverse to the first direction, so that gas that was enriched in the first component and stored in the second space in step (c) flows into the adsorbent bed at the second end of the flow path to purge the adsorbent bed, while a gas mixture depleted in the first component relative to the feed gas mixture flows out of the adsorbent bed at the first end of the flow path, (g) removing from the first portion of the working space a fraction in the range of at least 20% up to 100% of the gas mixture depleted in the first component relative to the feed gas mixture that has flowed from the adsorbent bed at the first end of the flow path in step (f) above, so as to limit the extent of reintroduction of this depleted gas mixture with the feed gas mixture to be introduced in a subsequent step (a) of the next cycle, and correspondingly to limit the concentration of the second component adjacent the first end of the flow path, (h) changing the volume of the working space by operating the cyclic volume displacement means, so as to change the working pressure from substantially the second pressure to substantially the first pressure, The above steps are repeated cyclically at the cyclic frequency, in an appropriate sequence of the steps. While steps (c), (e), (f) and (h) must be performed in that order, there is considerable freedom to perform the other steps in a sequence that may differ from the order of the steps as listed above. It will also be understood that the steps may overlap to some extent.

In many embodiments of the invention to be described, the exhaust valve is connected to the first end of the flow path, and is used in step (g) above to remove the depleted gas mixture from the working space. The apparatus then includes means to limit reintroduction of depleted gas mixture with the feed gas mixture to be introduced from the feed supply valve in a subsequent step (a). In some embodiments of the invention (including those with no cyclic volume displacement means at the first end of the flow path), substantially all of the depleted gas mixture is removed from the working space through the exhaust valve in each step (g). Thus, concentration of the second component adjacent the first end of the flow path is limited and can be minimized by large exchanges of fresh feed gas for the depleted gas mixture at the first end of the flow path. This feature is highly important in applications when the feed gas contains a second component that is condensible and thus could deactivate the adsorbent material if concentrated excessively in the flow path. Oxygen concentration from humid air, using zeolite molecular sieve adsorbents, is such an application.

When the product is to be enriched in the more readily adsorbed component, the first pressure will be a lower pressure than the second pressure. Conversely, the first pressure will be a higher pressure than the second pressure when the product is to be enriched in the less readily adsorbed component. When the working pressure is being changed between the first and second pressures, the product delivery valve is usually closed, and the feed supply and exhaust valves would usually only be open when they connect to compression or expansion chambers whose internal pressure is changing to remain equal to the working pressure. Pressure changes are accomplished primarily by the cyclic volume displacements of the cyclic volume displacement means associated with the adsorbent bed; and secondarily by any cooperating compression or expansion chambers connected through open feed supply or exhaust valves, and by heating or cooling of the gas associated with any thermal gradient along the flow path. In preferred embodiments of the invention, work of expansion is recovered from one part of the cycle to provide work of compression for another part of the cycle, either in the same apparatus or in a similar apparatus operated in opposite (or at least different) phase.

While the invention is generally applicable to purifying either the more readily adsorbed component or the less readily adsorbed component of the feed gas mixture, two adsorbent beds operated according to the invention may be connected back to back within a single working space to provide simultaneous purification of both components in an apparatus with two adsorbent beds and three cyclic volume displacement means. The second adsorbent bed is connected to the first end of the flow path of the first adsorbent bed, and will be used to concentrate and purify the second component while the first adsorbent bed concentrates and purifies the first component to the second end of its flow path. Gas mixture depleted in the first component and flowing in the second direction from the first adsorbent bed in step (f) flows directly into the second adsorbent bed, and is thus removed from the first end of the flow path during a step (g) concurrent with step (f). During the next step (c), gas mixture somewhat enriched in the first component will flow back from the second adsorbent bed to the first end of the flow path through the first adsorbent bed.

The invention includes optional means to provide transverse uniformity of flow which has left an end of the flow path, and is flowing into a space communicating with that end of the flow path, the volume of the space being changed by cyclic volume displacement means so that substantially purified gas will enter the space from the communicating end of the flow path when the volume is being expanded, and will flow back into the adsorbent bed as reflux or purge when the volume is subsequently being contracted. The volume of the space is being increased in an axial direction, and the flow in the space (relative to the adsorbent bed) is uniform transverse to the axial direction, so that the gas in the space is stratified in the axial direction according to the time of entry. Gas entering the space later will be less pure owing to incipient breakthrough of impurities as the mass transfer zone in the adsorbent bed approaches the end. Stratification enabled by transversely uniform flow will enable the gas in the space to maintain an a axial concentration gradient, so the gas reentering the bed during the purge step wil be initally less pure and finally more pure. The purge step will thus be more effective, and higher purity product will be produced.

The principles of the invention will be illustrated by the specific embodiments to be discussed below. It will be appreciated that the features of these embodiments may be separated or combined in many ways other than those illustrated.

DETAILED DISCLOSURE

FIG. 1

Figure 1:
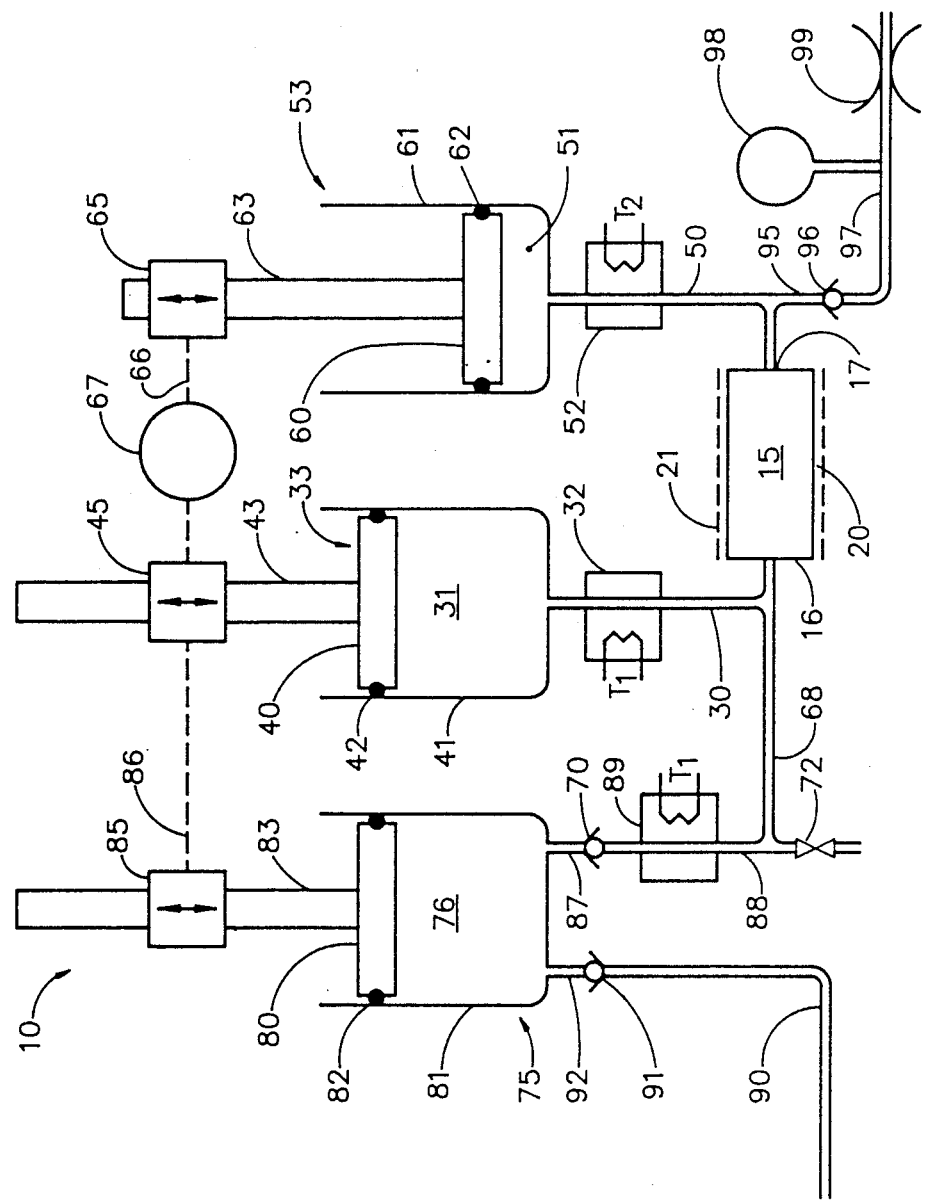
FIG. 1 is a simplified schematic of a pressure swing adsorption apparatus for concentrating and purifying the less readily adsorbed component of a gas mixture, with a feed compressor reciprocating at the same cyclic frequency as the cyclic volume displacement means associated with the adsorbent bed.

A pressure swing adsorption apparatus 10 is adapted to separate and purify a first component from a feed gas mixture, using an adsorbent material over which the first component is less readily adsorbed relative to a second more readily adsorbed component of the feed mixture. Hence, the second pressure will be higher than the first pressure, as discussed above. The apparatus 10 includes an adsorbent bed 15 having a first end 16 and a second end 17 defining first and second ends respectively of a flow path through the adsorbent bed. The adsorbent bed is contained within an adsorbent bed housing 20 providing fluid connections to the first end of the flow path at the first end 16 of the adsorbent bed, and to the second end of the flow path at the second end 17 of the adsorbent bed. The adsorbent material may be granular pellets packed in housing 20 so that the flow path is provided by interconnecting interstices between the pellets, or may be formed as a monolithic structure providing a multiplicity of channels contacting the adsorbent material and in parallel communication between the first and second ends of the adsorbent bed. The adsorbent bed housing 20 may have external insulation 21 to suppress heat transfer across the walls of the housing and to avoid thermal gradients transverse to the flow path.

The adsorbent bed is shown connected at its first end 16 by conduit 30 to a first space 31. The flow passing through conduit 30 may be maintained substantially at a first temperature T1 by an optional first heat exchanger means 32. The first space 31 is cyclically varied by first cyclic volume displacement means 33 provided as first piston 40 reciprocating in first cylinder 41, with fluid sealing means 42. The first piston 40 is connected by piston rod 43 to first reciprocating drive means 45 which establishes reciprocation of the first piston at an operating cyclic frequency. It is noted here that in some embodiments of the invention, the first space 31 and the first cyclic volume displacement means 33 may be omitted.

The adsorbent bed 15 is also connected at its second end 17 by conduit 50 to a second space 51. The flow passing through conduit 50 may be maintained substantially at a second temperature T2 by an optional second heat exchanger means 52. The second space 51 is cyclically varied by second cyclic volume displacement means 53 provided as second piston 60 reciprocating in second cylinder 61 with fluid sealing means 62. The second piston 60 is connected by second piston rod 63 to second reciprocating drive means 65 which cooperates with the first reciprocating drive means 45 through drive coupling 66 to establish reciprocation of the second piston at the same frequency and with a desired phase relative to the reciprocation of the first piston. A drive motor 67 cooperates with drive coupling 66 to drive the first and second reciprocating drive means.

The first end of the adsorbent bed is connected by conduit means 68 to a feed supply valve 70 and an exhaust valve 72. Feed supply valve 70 connects the first end of the adsorbent bed through conduit 68 to a feed compressor means 75. Feed compressor means 75 here includes a compression chamber 76 whose volume is cyclically varied by compressor piston 80 reciprocating in compressor cylinder 81 with fluid sealing means 82. Compressor piston 80 is connected by piston rod 83 to compressor reciprocating drive means 85. In the example of FIG. 1, the compressor reciprocating drive means cooperates with the first and second reciprocating drive means through drive coupling 86, so that the compressor piston reciprocates at the same frequency and with a desired phase relative to the first piston.

Compression chamber 76 is connected by conduit 87 through feed supply valve 70 to conduit 88 which is connected to conduit 68 and the first end of the adsorbent bed 16. Feed supply valve 70 is a non-return valve permitting flow from the compression chamber to the first end of the adsorbent bed. A heat exchanger 89 may be included in conduit 87 or 68 to adjust the temperature of the feed gas to approximately the first temperature T1. The feed gas mixture is introduced into the compression chamber 76 from feed conduit 90 by inlet non-return valve 91, which is connected to the compression chamber by conduit 92.

The second end 17 of the adsorbent bed 15 is connected by conduit 95 to product delivery means including product delivery valve 96, which is here a non-return valve permitting product flow from conduit 95 to delivery conduit 97, whose internal pressure is regulated to equal approximately the second pressure by product pressure control means here shown as a receiver 98 and a control valve 99.

In response to the cyclic action of the reciprocating pistons, the working pressure of the gas mixture in the flow path through the adsorbent cycles between a second pressure which in this example of purifying the less readily adsorbed component is a relatively higher pressure, and a first pressure which in this example is a relatively lower pressure. Feed supply valve 70 and product delivery valve 96 are both open when the working pressure is substantially the second pressure, and gas flows in a first direction along the flow path from the first end 16 to the second end 17 of the adsorbent bed. The gas flowing in the first direction at the relatively higher second pressure is enriched in the less readily adsorbed first component because the more readily adsorbed second component is then preferentially adsorbed and immobilized on the adsorbent bed. Exhaust valve 72 is opened when the working pressure is substantially the relatively lower first pressure, and gas enriched in the now desorbed first component flows in a reverse second direction along the flow path from the second to the first end of the adsorbent bed.

The apparatus has a working space which is defined to be the sum of all spaces within the apparatus communicating freely with the adsorbent bed during all steps of the process. Chambers separated from the adsorbent bed by valves which are closed during some step of the process are excluded from the working space as defined. The working space includes the adsorbent bed volume within housing 20, a first portion of the working space including the first space 31 and conduits 30 and 68, and a second portion of the working space including the second space 51 and conduits 50 and 95.

The apparatus of FIG. 1 may be operated with a range of relative phases in the reciprocation of the first and second cyclic volume displacement means. Thus, the first and second pistons could be reciprocated in phase, so that the first and second volumes are maximized (and minimized) approximately simultaneously. However, superior separation performance will be achieved in the operating cycle to be described below with reference to FIG. 1. In this preferred operating cycle, the second cyclic volume displacement means is reciprocated with a leading phase of its volume variations relative to the volume variations of the first cyclic volume displacement means, so that the first volume reaches its maximum (and minimum) limits after the second volume has passed through the corresponding limits. It will be understood that the reciprocating drive means 45, 65 and 85 may be provided by any reciprocating mechanism including rotating cranks or cams, or reversing linear electromagnetic or hydraulic motors. The pistons may be replaced by diaphragms or other volume displacement means. The periodic variation of the first and second spaces, and of the compression chamber, may alternatively be provided by a rotary displacement mechanism entailing orbital or eccentric rotation of displacement elements without linear reciprocating action, for example sliding vane or trochoidal rotary piston mechanisms.

It should be emphasized that the first and second temperatures T1 and T2 may be different, or they may be approximately identical. When the first and second temperatures are different, there will be a corresponding temperature gradient along the flow path through the adsorbent bed, which then functions as a thermal regenerator owing to the heat capacity of the adsorbent material and any associated support material.

With the apparatus of FIG. 1, pressure changes between the first and second pressures can be achieved with only modest flows along the flow path through the adsorbent bed during intervals of pressure change, because the effective compressibility of the gas mixture over the adsorbent bed is accommodated by coordinated volume changes at both ends of the bed. The first and second pistons are cyclic volume displacement means associated with the adsorbent bed, and acting to change the volume of the working space so as to change the working pressure over the adsorbent material between the first and second pressures.

The feed compressor means acts as a feed source supplying feed gas compressed to the second pressure to the first end of the adsorbent bed when the working space is pressurized to substantially the second pressure. In this embodiment, the feed compressor may assist in raising the working pressure in the working space when pressure is being increased to the second pressure, if it causes a more rapid pressure rise in compression chamber 76 so that feed gas flows into the first portion of the working space through feed supply valve 70 during the compression step.

Feed compressor 75 is a feed supply means, including feed supply valve 70. Compression chamber 76 is a compressor valved chamber, cooperating with valves 91 and 70 to induct feed gas mixture at the feed pressure in conduit 90, and deliver the feed gas mixture at substantially the second pressure to the first end of the flow path. The feed supply means is here also means to generate flow in the flow path in the first direction when the working pressure is substantially the second pressure, in cooperation with the first and second cyclic volume displacement means. Feed supply valve 70 will be open, and compression chamber 76 will communicate with the working space, when there is flow in the first direction at the first end of the flow path. The valved compression chamber 76 cooperates with the first and second cyclic volume displacement means to change the pressure in the working space, when the pressure is being increased. Exhaust valve 72 is an exhaust means, and product delivery valve 96 is a product delivery means.

It will be evident that energy applied to the first and second pistons to raise the working pressure can be recovered by suitable mechanical means, since expansion energy is delivered by these pistons when the pressure is reduced during an expansion interval. A portion of the energy required to operate the feed compressor can also be recovered, corresponding to the fraction of feed gas expanded each cycle in the working space and discharged through the exhaust valve 72. If several identical apparatuses as shown in FIG. 1 are operated in parallel and with sequenced reciprocating phase, the expansion energy delivered from one apparatus can readily be recovered to provide compression energy to another apparatus, or indeed may be stored to return compression energy to the same apparatus which delivered the expansion energy.

In the preferred operating cycle for the apparatus of FIG. 1, the process is conducted with the following steps, starting from the position of the apparatus as shown in FIG. 1. In the starting position, exhaust valve 72 is closed, the compression chamber 76 is expanded and filled with feed gas mixture at the feed pressure, the first space is filled with depleted gas mixture (depleted in the first component relative to the feed gas mixture) from the previous cycle, and the working pressure in the flow path is the first pressure.

(a) Compression step. The volume of the working space is contracted by downwards motion of the first piston 40, and perhaps also of the second piston 60. The relative movements of pistons 40 and 60 may be coordinated so that there is flow into the adsorbent bed from both ends during the compression step, and the flow velocity is then zero at a point of the flow path intermediate between the ends of the adsorbent bed. The volume of compression chamber 76 is also contracted by piston 80. Some feed gas mixture may flow into the first portion of the working space through feed supply valve 70, as the working pressure rises to substantially the second pressure. The gas mixture contacting the adsorbent becomes enriched in the first component owing to the pressure change from first to second pressures.

(b) Feed step. With the working pressure at substantially the second pressure, compression chamber 76 and first space 31 continue to contract by downward motion of pistons 80 and 40, while the second space 51 is expanded by upwards motion of second piston 60. Feed gas mixture flowing through feed supply valve 70 and the depleted gas mixture from the first space 31 both (at temperature T1) enter the adsorbent bed at its first end 16, generating flow in the flow path in the first direction. Gas enriched and substantially purified in the first component flows from the second end 17 of the flow path into the second portion of the working space, and a portion of this purified gas is stored (at temperature T2) in the expanding second space while the balance is delivered as product gas through product delivery valve 96. At the end of the feed step, compression chamber 76 and first space 31 have contracted to their minimum volume.

(c) Expansion step. The volume of the working space is increased by expanding the second space 51 by upwards motion of the second piston 60, and perhaps also by limited upwards motion of the first piston 40 partially expanding the volume of first space 31. The movement of pistons 60 and 40 may be coordinated so that gas flows out of the adsorbent bed from both ends during the expansion step, and flow velocity is then zero at a point on the flow path intermediate between the ends of the adsorbent bed. Both the product delivery valve 96 and the feed supply valve 70 close at the beginning of the expansion step, while the exhaust valve remains closed while the working pressure over the flow path drops to approximately the first pressure. The volume of compression chamber 76 (which is no longer communicating with the first space) is expanded by upward movement of piston 80. The pressure in compression chamber 76 drops rapidly to the first pressure, and this chamber then fills with fresh feed gas inducted through inlet valve 91. At the end of the expansion step, second space 51 has been expanded to its maximum volume, and is filled with gas enriched in the first component which is thus stored in the second space. Gas mixture contacting the adsorbent becomes depleted in the first component owing to the pressure change from second to first pressures.

(d) Purge step. While the working presssure over the adsorbent is substantially the first pressure, exhaust valve 72 is opened. The second space 51 is contracted by downwards motion of piston 60, causing gas enriched in the first component (which was stored in the second space in the feed and expansion steps) to flow into the adsorbent bed from second end 17, thus generating flow in the second direction along the flow path. Gas mixture depleted in the first component flows out of the adsorbent bed from its first end 16, and is at least partly exhausted from the working space through conduit 68 and exhaust valve 72. The first space 31 may be expanded by upwards motion of piston 40 to receive a portion of the gas mixture depleted in the first component that flows out from the first end of the adsorbent bed. The exhaust valve is then closed, and the apparatus has returned to its starting position from which the above cyclic steps are repeated.

During the compression step, heat of compression is generated mostly in the compression chamber 76 and the first space 31 which then contain most of the free gas within the apparatus. During the feed step, this heat of compression may be removed from the apparatus at approximately temperature T1 by heat exchangers 89 and 32, and gas enters the first end of the adsorbent bed at that temperature. During the expansion step, heat of expansion is taken up by the gas which is then mostly in the second space 51. This heat of expansion can be provided to the apparatus at approximately temperature T2 by heat exchanger 52.

Over a complete operating cycle, heat of compression is delivered from the apparatus at the first temperature from adjacent the first end of the flow path and from the feed gas compressor, and heat of expansion is taken up at the second temperature adjacent the second end of the flow path. The heat exchangers and any insulation preventing heat exchange from portions of the apparatus, in cooperation with the cycle itself, are means for maintaining the temperatures of the first end of the flow path at the first temperature, and the second end of the flow path at the second temperature; while the adsorbent bed serves as a thermal regenerator in the flow path.

The apparatus thus performs a a regenerative thermodynamic cycle characterized by steps (the feed and purge steps) with flow at constant pressure in each direction through the adsorbent bed (which acts as a thermal regenerator). This cycle is based on the Ericsson cycle, which is related to the ideal Stirling cycle whose flow steps are theoretically conducted at constant volume. With the definition that volume changes in the second space always have a leading phase with respect to volume changes in the first space, this cycle effectively transports heat from the second space to the first space. If the first temperature is greater than the second temperature, the cycle is a heat pump cycle converting some of the heat of compression delivered in the compression chamber and the first volume from mechanical work. If the second temperature is greater than the first temperature, the cycle is an engine cycle converting some of the heat of expansion taken up from the second volume into mechanical work, which may assist operating the apparatus.

The depleted gas mixture which flows out of the adsorbent bed (with flow in the second direction at the first end of the flow path) during the expansion and purge steps may flow in part into the first space 31 if that space is expanding, but cannot flow into the compression chamber because feed supply valve 70 is a non-return valve preventing reverse flow. Hence, the valved compression chamber is means to exchange feed gas mixture for depleted gas mixture, and to restrict mixing of depleted gas mixture about to be exhausted with feed gas mixture that has been inducted into the compression chamber and will be introduced to the flow path. By displacement of feed gas from the compression chamber (into which no depleted gas mixture can enter) into the working space, relatively large volumes of depleted gas mixture can be exhausted through the exhaust valve while still achieving a desired pressure ratio between first and second absolute pressures. Hence, the compression valved chamber is means to restrict reintroduction of depleted gas mixture to the flow path, and to assist the exhaust valve in removing a large fraction of the depleted gas mixture flowing from the first end of the flow path during the purge step. As the swept volume of the compression chamber is made larger relative to that of the first space, the fraction of depleted gas mixture removed is increased, so that the maximum concentration of second component at the first end of the adsorbent bed is limited.

EXAMPLE NO. 1

A particular example of the combined pressure swing adsorption cycle and a thermodynamic engine cycle is based on the use of waste heat from a combustion process as a supplemental power source to generate oxygen for the process. In this example, the feed gas mixture is air introduced at atmospheric pressure and the adsorbent is a zeolite having a high selectivity to adsorb nitrogen with preference to oxygen. The first temperature is ambient temperature and the second temperature is a moderately elevated temperature of about 100 degrees Celsius. The product gas is enriched oxygen which is delivered both preheated and precompressed, using waste heat as a power source for air separation with important benefits relative to prior art energy intensive air separation processes.

Alternatively, higher purity in air separation may be achieved using the Ericsson cycle in a refrigeration mode to cool the adsorbent bed for improved adsorptive selectivity and capacity. This may be achieved by eliminating the second heat exchanger 52, and insulating the walls of the adsorbent bed housing 20 and cylinder 61 so as to depress the second temperature at the second end of the flow path in steady state operation of the apparatus. A modest refrigeration effect would be achieved without insulation, owing to normal heat conduction resistance of the walls.

FIG. 2

Figure 2:
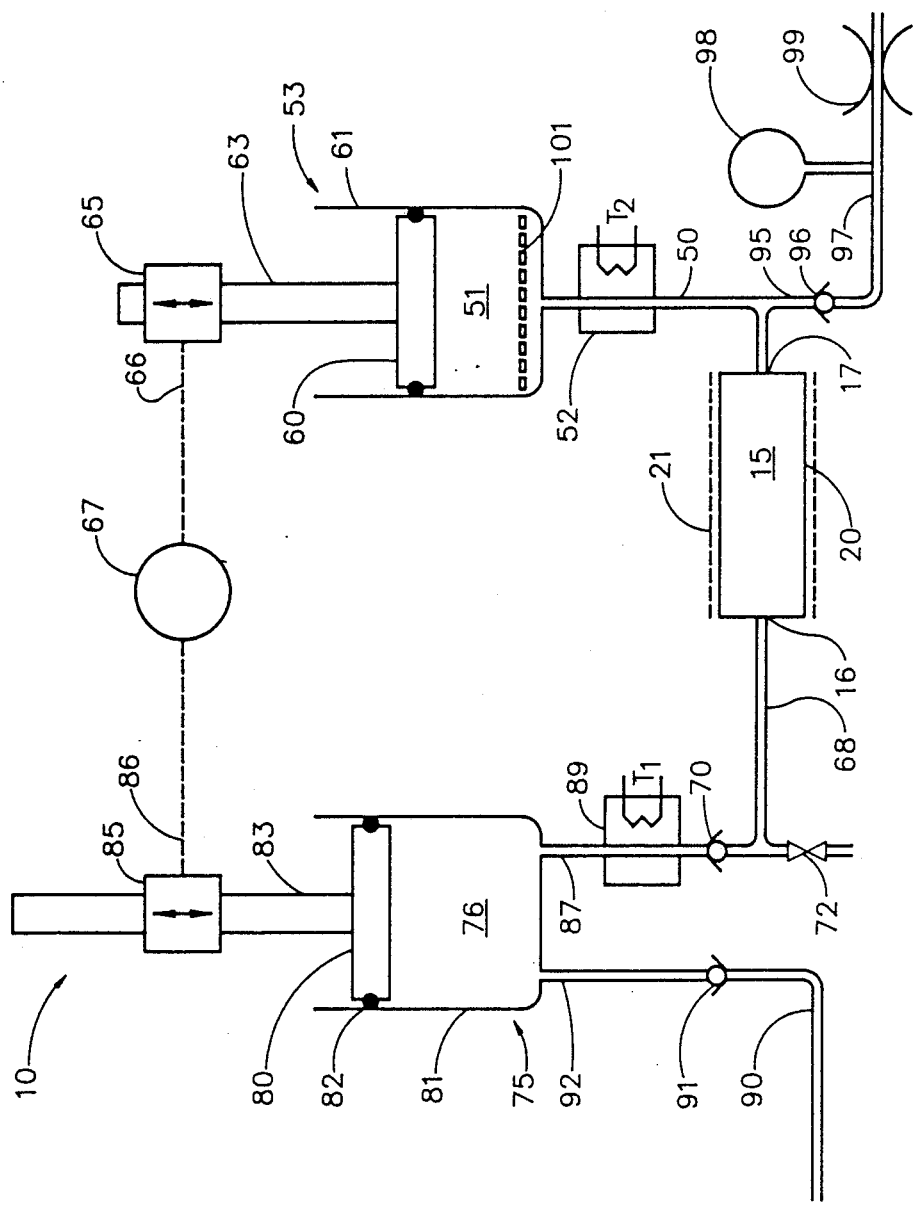
FIG. 2 shows a similar apparatus, but with no cyclic volume displacement means at the first end of the adsorbent bed.

A simplified apparatus 100 is shown in FIG. 2, having no cyclic volume displacement means in the first portion of the working space. All other components are similar to those of FIG. 1, and accordingly the same component nomenclature and numbering is used.

The first portion of the working space thus comprises only the internal volumes of conduit 68 connected to the first end 16 of adsorbent bed 15, while the second portion of the working space as before includes the second space 51 varied by second cyclic volume displacement means 53, here shown as piston 60 reciprocated by drive means 65. Reciprocating drive means 65 cooperates with reciprocating drive means 85 which reciprocates feed compressor piston 80, so that piston 60 and compressor piston 80 reciprocate at the same periodic frequency, and volume changes in the second space have a leading phase with relation to volume changes in compression chamber 76 under compressor piston 80.

The process with the apparatus of FIG. 2 is modified from the operating steps described above for FIG. 1, as volume changes in the second space must provide the total volume change of the working space required to accomplish changes of the working pressure over the adsorbent bed.

The operating cycle will be described briefly, starting with the apparatus of FIG. 2 in the position shown, in which the second space is partly filled with gas (enriched in the first component by previous operating cycles), the working pressure is the first pressure, exhaust valve is closed, and compression chamber is fully expanded and filled with fresh feed gas mixture.

The compression step proceeds by downward motion of piston 60 to contract the second space 51, while compression piston 80 also moves downward to contract the compression chamber. The pressure in the flow path and in the compression chamber rises to substantially the second pressure. If the pressure rise in the compression chamber is faster, non-return feed supply valve 70 would open so that feed gas flow from the compression chamber into the first end of the adsorbent bed would assist the pressurization of the working space.

The feed step proceeds by upward motion of second piston 60 to expand second space 51, while compression piston 80 completes its downward motion to discharge feed gas mixture at substantially the second pressure into the first end of the adsorbent bed. Flow is generated in the first direction along the flow path, and gas enriched in the first component is partly stored in the second space 51, and partly delivered as product through product delivery valve 96.

The expansion step proceeds by continued upwards motion of second piston 80 to complete the expansion of second space 51, and reduce the working pressure in the working space. Gas enriched in the first component flows from the second end of the adsorbent bed into the second space 51, and is stored there. Non-return feed supply valve 70 closes at the beginning of the expansion step, so that there is no flow of depleted feed gas (mixture depleted in the first component) back from the adsorbent bed into the compression chamber, where it would mix with the next charge of fresh feed gas. Compression chamber 76 is expanded by upward motion of compressor piston 80 to induct fresh feed gas at approximately the first pressure, during either the expansion or the purge step.

The purge step proceeds after the exhaust valve 72 is opened, by contracting the second space 51 by downwards motion of the second piston 60 to generate flow of gas (enriched in the first component) back into the second end of the adsorbent bed to purge the bed. Gas depleted in the first component and enriched in the second component (depleted gas mixture) is exhausted from the first end 16 of the adsorbent bed through conduit 68 and exhaust valve 72, and all of this depleted gas mixture is removed from the working space except a minimal amount remaining in conduit 68 after exhaust valve 72 is closed. The cycle is then repeated.

The embodiment of FIG. 2 is distinguished by its provision of means (non-return valve 70 cooperating with exhaust valve 72) to remove from the first portion of the working space substantially all of the gas mixture depleted in the first component that has flowed from the adsorbent bed during the purge step, by preventing flow from the first end of the adsorbent bed during the expansion step. Thus, means is provided to prevent reintroduction of this depleted gas mixture with the fresh feed gas in a subsequent feed step; and to prevent accumulation and excessive concentration of the feed gas adjacent the first end of the flow path. Flow of depleted feed gas mixture into the compression chamber during the expansion step may alternatively be prevented by coordinating the action of reciprocating drive means 85 and 65 during the expansion step, so that the instantaneous pressure in the compression chamber is closely equal to the pressure at the first end of the adsorbent bed, although there is no flow in conduit 68. The reciprocating drive means 85 or 65 must generate somewhat nonsinusoidal trajectories of pistons 80 or 60 in order to maintain the same pressure in conduits 85 and 68 (to maintain the zero flow condition approximately at the first end of the flow path) during the expansion step, but it then is possible to eliminate non-return valve 70 (so that conduits 85 and 68 communicate freely) while substantially avoiding flow of depleted gas mixture from the adsorbent bed into compression chamber 76 during the expansion step. Appropriate piston trajectories will maintain the volume of the compression space 76 (which is now a first space communicating with the flow path since non-return valve 70 has been removed) approximately stationary at its minimum volume during the entire expansion step, while the second space is expanded relatively rapidly from a small to large volume of the second space. Such piston motions can be generated by cam drives, or by rotating cranks connected through suitable linkages. Dwell in the motion of piston 80 at its top dead centre (maximum contraction of chamber 76) may be achieved through an inverted crank-slider drive using a short connecting rod (i.e., connecting rod length less than twice the crank throw radius), and fast travel of piston 60 in its upward expansion stroke may be provided by a crank-slider drive whose crank axis is offset to give fast upward motion and slow downward motion.

A further inventive refinement, applicable optionally to all embodiments of the invention, is flow distribution means 101 at the entrance of conduit 50 into the second space 51. Flow distribution means 101 is a diffuser or baffle disposed to distribute the flow of gas enriched in the first component entering the second space (during feed and expansion steps) evenly across the diameter of second cylinder 61. Hence, the flow velocity in the second space will be uniform across the transverse direction to the reciprocation axis, and gas in the second space will be stratifed according to the moment of discharge from conduit 50 into the second space. This gas will be most pure in the first component at the beginning of the feed step. Thus, less pure gas entering the second space later in the feed step or during the expansion step will flow back into the adsorbent bed during the initial part of the purge step, and more pure gas will flow back into the adsorbent bed during the latter part of the purge step. Thus, transversely uniform flow in the second space improves the efficacy of the purge step, so that greater purity of product gas withdrawn in the early part of the feed step can be achieved. Means has been provided to inhibit mixing of more and less pure gas (enriched in the first component) stored in the second space, so as to enhance product purity. This principle may be applied more generally to any pressure swing adsorption device, in which a partially purified product is stored in a variable volume space (as it flows from the adsorbent bed into the space which is expanding) and will be used subsequently in reverse flow to purge the adjacent end of the bed of the impure components.

FIG. 3

Since pressure changes in the adsorbent bed can be accomplished by the cyclic volume changes in the first and second volumes, the adsorbent bed with associated cyclic volume displacement means can change its working pressure between the first and second pressures without the necessary help of the feed compressor. Thus the apparatus of FIG. 1 or 2 could be operated with the feed supply valve closed during the compression step, so that the compression chamber is out of communication with the working space while the working pressure is changing. It is then no longer necessary for the feed compressor to be a reciprocating compressor operating at the same cyclic frequency as the first and second reciprocating drive means, as the feed supply valve is opened only when the working pressure in the working space is substantially the second pressure.

Figure 3:
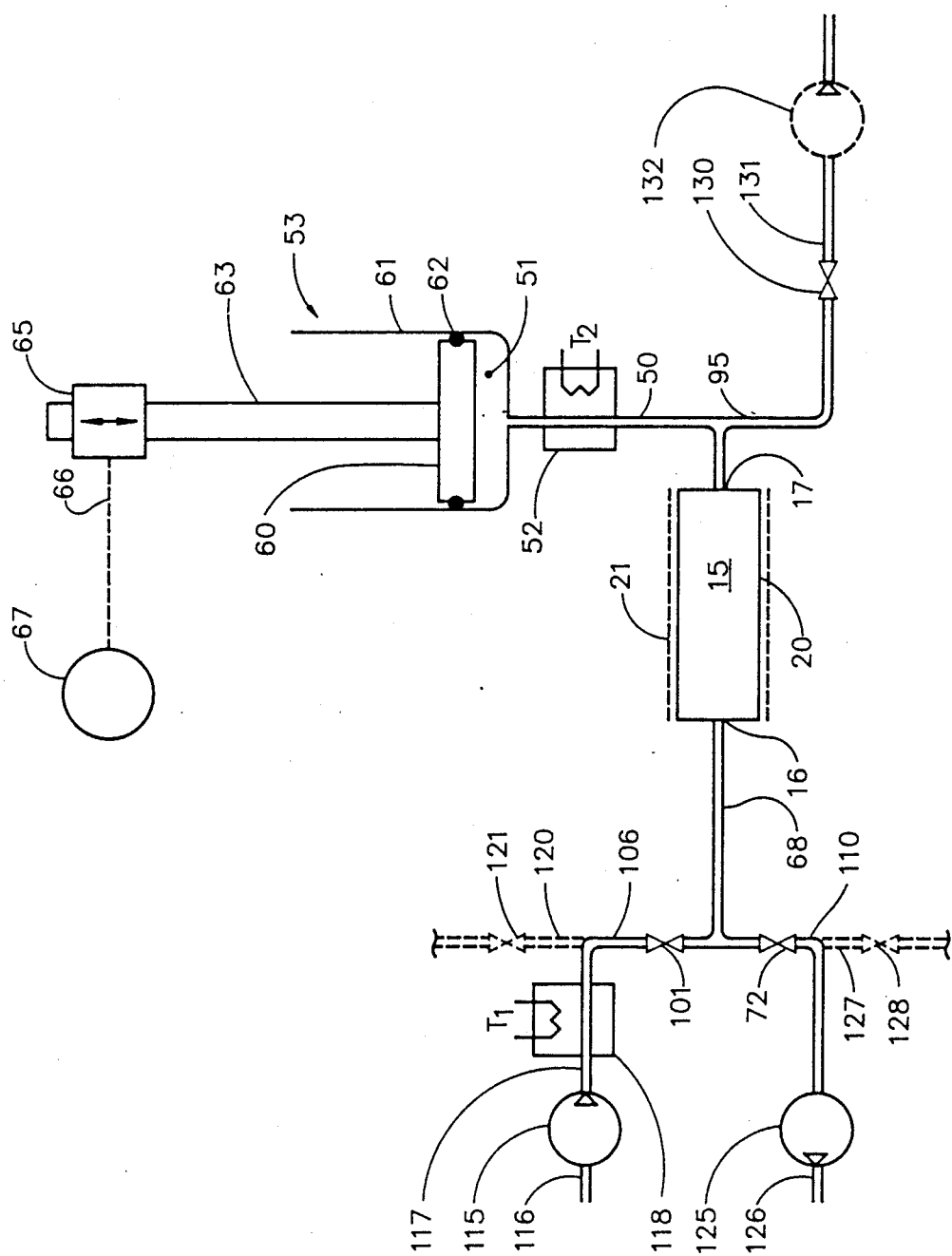
FIG. 3 shows an apparatus with generalized arrangements for supply of the feed gas mixture at the second pressure, exhaust of depleted gas at the first pressure, and delivery of the product gas.

The embodiment 102 shown in FIG. 3 uses the same component nomenclature and numbering as FIGS. 1 and 2, except for substitution of more general feed supply means to supply the feed at the second pressure, and likewise more general product exhaust means to remove the depleted gas mixture. A first cyclic volume displacement means is omitted from FIG. 3 as in FIG. 2, but could be optionally included and connected to conduit 68 as in FIG. 2. In this embodiment, feed supply valve 105 is a shut-off valve connected to the first end 16 of adsorbent bed 15 by conduit 68, and opening to feed conduit 106 whose internal pressure is maintained at substantially the second pressure. Feed supply valve 105 is opened to connect conduits 106 and 68 when the working pressure over adsorbent bed 15 is substantially the second pressure, and is otherwise closed.

Likewise, exhaust valve 72 is still a shut-off valve, connected to the first end of the adsorbent bed through conduit 68, and opening to exhaust conduit 110 whose internal pressure is maintained at substantially the first pressure. Exhaust valve 72 is opened to connect conduits 68 and 110 when the working pressure over the adsorbent bed is substantially the first pressure, and is otherwise closed.

As stated, the internal pressure of feed conduit 106 is maintained at substantially the second pressure. If the feed mixture is supplied to the apparatus with a lower feed pressure in conduit 116, feed compressor 115 is required to compress the feed gas mixture from inlet conduit 116, and deliver the feed gas mixture to delivery conduit 117 and feed conduit 106 at substantially the second pressure. A heat exchanger 118 in conduit 117 may adjust the temperature of the compressed feed gas to first temperature T1, often by removing heat of compression. It will be evident that the feed compressor 115 and feed supply valve 105 constitute a feed supply means, with the compressor serving as means to maintain the internal pressure of conduit 106 at substantially the second pressure, and also to generate flow in the flow path through the adsorbent bed during the feed step.

It will be evident that a single compressor could provide flow to a multiplicity of identical pressure swing adsorption apparatuses operating in parallel and in phased sequence so the the flow demand from the compressor is uniform. This possibility is indicated on FIG. 3 by showing in dashed lines a second feed conduit 120 connecting the discharge of compressor 115 to a second feed supply valve 121 which could supply feed gas mixture to a second apparatus operating in parallel.

The apparatus of FIG. 3 operates across the pressure difference between the second pressure in feed conduit 102 and the first pressure in exhaust conduit 110, and can operate at elevated or subatmospheric pressures. In order to illustrate the applicability of the invention to subatmospheric operation (which often provides enhanced adsorbent selectivity), FIG. 3 shows a vacuum pump 125 drawing the depleted gas mixture gas through conduit 110 from exhaust valve 72 which is opened when the working pressure is the subatmospheric first pressure. The vacuum pump cooperating with exhaust valve 72 is an exhaust means generating flow in the first direction to accept depleted gas mixture from the first end of the flow path when the pressure is trhe first pressure, and discharging the depleted gas mixture at the higher (often atmospheric) discharge pressure of discharge conduit 126. Exhaust valve 72 is only opened when the pressure in the adsorbent bed has been equalized to the subatmospheric first pressure by expansion of the cyclic volume displacement means communicating with the flow path. Again, one vacuum pump 125 could serve a multiplicity of identical gas separation units operating in parallel and in phased sequence. This possibility is illustrated by showing in dashed lines a second exhaust conduit 127 connecting exhaust conduit 110 to a second exhaust valve 128 exhausting depleted feed gas at the first pressure from a second apparatus operating in parallel.

It will be clear that vacuum pump 125 is an exhaust means to maintain the internal pressure of the exhaust conduit at substantially the first pressure, and to generate flow in the flow path during the purge step. If the apparatus was operating at elevated pressure so that the first pressure is in excess of the discharge pressure, vacuum pump 125 could be replaced by a expander accepting the exhaust gas from exhaust conduit 110 at substantially the first pressure. Also, receivers could be included in exhaust conduit 110 and delivery conduit 117 to smooth flow pulsations. In this embodiment, the feed supply means and exhaust means serve as means to remove substantially all depleted gas mixture that flows from the first end of the adsorbent bed during the purge step, and thus to and thus to exchange feed gas for depleted gas mixture so that mixing of depleted gas mixture into feed gas being introduced is prevented.

In FIG. 3, the product delivery means is also generalized. The second end 17 of adsorbent bed 15 is connected by conduit 95 to product delivery valve 130, which is a shut-off valve connecting conduit 95 to product delivery conduit 131. The internal pressure in conduit 131 is maintained at a product delivery pressure. Valve 130 can be opened to deliver product when the internal pressure in conduits 95 and 131 is approximately equalized, so that the working pressure and product delivery pressure are approximately equal. While superior purification performance is expected if product is withdrawn at substantially the second pressure (so that the product gas is delivered directly from the second end 17 of the adsorbent bed with greatest enrichment of the desired component), this aspect is marginal since all gas flowing into the second volume 51 will be substantially purified in steady state operation. Thus, the second volume 51 acts as a reservoir of purified product, and product can be withdrawn by opening product delivery valve 130 when the working pressure is at any convenient pressure (between the first and second pressures inclusive) slightly in excess of the product delivery pressure in conduit 131. A compressor (or blower) 132 might be included in the product delivery means, to accept product gas from the product delivery valve 130 and increase the product delivery pressure above the working pressure when the product delivery valve 130 is open. Product compressor 132 may also serve as a means to generate flow in the flow path in the first direction, if product delivery valve 130 is open when the working pressure is substantially the second pressure.

When the second pressure is greater than the first pressure (as is the case when concentrating a less readily adsorbed first component), pneumatic energy is provided to the apparatus by the supply of feed at a relatively elevated pressure and the removal of exhaust at a relatively lower pressure. In the operating cycle corresponding to FIGS. 1, 2, and 3, there are more moles of gas in the working space during the expansion step than during the compression step.

By recovering the work of expansion during the expansion step through mechanical drive means 45 and 65, and applying this energy back through mechanical drive means 45 and 65 to provide work of compression during the compression step while overcoming friction losses, the apparatus can be entirely pneumatically powered by the pressure difference between the feed and exhaust flows, so that no separate mechanical power source need be applied to the mechanical drive means to reciprocate the cyclic volume displacement means. With a single apparatus, work of expansion can be stored as potential energy (i.e. over springs) or kinetic energy (i.e. over flywheels) during the expansion step, and returned to the apparatus as work of compression during the compression step. By using a plurality of apparatuses according to the invention operating in parallel and with interconnected mechanical reciprocating drive means cycling at the same frequency and sequenced phase, the work of expansion from one apparatus can be applied directly as work of compression to another apparatus.

The above discussion of FIGS. 1, 2 and 3 has considered the case in which the desired component to be enriched into the product is a less readily adsorbed component as the first component, so that the second pressure is greater than the first pressure. The apparatus of FIG. 3 may also be applied to the opposite case in which the desired component to be concentrated into the product is the more readily adsorbed component as the first component, and the first pressure is greater than the second pressure. In this case, the order of steps in each cycle must be modified to take into account the inversion between first and second pressures. During the compression step, the second space contracts from a maximum volume to an intermediate volume, while the working pressure changes from the second pressure to the first pressure. Then the second space is contracted fully during the purge step, while gas mixture depleted in the first component is removed at the first pressure through the open exhaust valve 72. The exhaust valve is closed, and the working pressure is changed from the first to the second pressure during the expansion step by expansion of the second space from its minimum volume to an intermediate volume. Next, the feed supply valve 105 and product delivery valve 130 are opened in the feed step, while flow in the flow path in the first direction is generated by the feed compressor 115 (which may be a blower), or by a compressor 132 (or blower) drawing the product gas from conduit 131.

The embodiment discussed in FIG. 3, in the case as illustrated that the first cyclic volume displacement means 33 of FIG. 1 has been omitted, achieves substantially complete removal of the gas depleted in the first component that flows from the first end of the adsorbent bed, so that reintroduction of such gas mixture into the adsorbent bed is minimized, and accumulation of the second component in the first portion of the working space is avoided. A first cyclic volume displacement means may be connected directly to the first end of the adsorbent bed as shown in FIG. 1, with the benefit of enabling lower flow velocities in the flow path during the steps of changing the pressure between the first and asecond pressures, but the disadvantage that some gas mixture enriched in the first component will enter the first space 31 and will be reintroduced to the adsorbent bed during the feed step. Consequent accumulation of the second component in the first space will still be modest if the volume displacement of the first cyclic volume displacement means is small relative to the amount of feed gas introduced by compressor 115 through feed supply valve 105 during each cycle.

EXAMPLE NO. 2

The apparatus of FIG. 3 is applicable to processes for removal of water vapour, solvent vapour, and other impurities from air. The water vapour, solvent vapour, or other impurity will be a more readily adsorbed second component with respect to pure air which is the first component, over adsorbents such as activated alumina or charcoal at ambient temperature. The second pressure will be higher than the first pressure. For dessicant drying of compressed air, the first pressure will be atmospheric and the second pressure will be the elevated pressure of the compressed air system. For removal of chemical impurities or solvent vapour from air, the second pressure will often be approximately or slightly above atmospheric, while the first pressure will then be subatmospheric. With a strongly adsorbed second component and a substantial pressure ratio between first and second absolute pressures, the volume of feed impure air introduced during each cycle will be relatively large, and the fraction of feed recovered as product will also be large. Hence, the flow in the first direction generated by compressor 115 (or 132) will be dominant relative to flows that might be generated in the flow path during the feed step by action of the cyclic volume displacement means.

FIG. 4

An embodiment 200 of the invention closely related to FIGS. 1, 2 and 3 is adapted to operate on a vacuum cycle, for the application of oxygen concentration in medical applications requiring oxygen at slightly above atmospheric pressure. All components within the working space are similar to FIG. 3, and have the same nomenclature and numbering. Heat exchangers are omitted. Vacuum pump 125 of FIG. 3 is replaced by a reciprocating vacuum pump 225, which reciprocates at the same cyclic frequency as the second cyclic volume displacement means 53. The adsorbent is a zeolite.

The apparatus 200 has a feed supply valve 272 connected to conduit 68 and thereby to the first end 16 of the adsorbent bed 15. Feed air is inducted through intake filter 250 to conduit 255 connected to feed supply valve 272. An optional blower (or compressor) 260 may be provided in conduit 255 as part of the feed supply means to pressurize the feed air from (atmospheric) feed pressure in conduit 255 to the somewhat higher second pressure, and as means to generate flow in the first direction during the feed step. If blower 260 is not included, a pump 265 may be provided in the product delivery means to draw product oxygen from conduit 97 and compress the oxygen to a useful product delivery pressure, and to generate flow in the first direction in the flow path during the feed step.

Vacuum pump 225 includes a pump chamber 276 whose volume is changed by piston 280, reciprocating in pump cylinder 281. Piston 280 is sealed by piston seal 282, and is reciprocated by piston rod 283 driven by pump reciprocating drive means 285. Drive means 285 is connected by drive coupling 286 to drive motor 67, and by drive coupling 66 to second reciprocating drive means 65, so that pump drive means 285 reciprocates at the same frequency as second drive means 65, and with a phase relation so that volume changes in pump chamber 276 lag volume changes in the second space 51.

Pump chamber 276 is connected by conduit 287 to non-return exhaust valve 288, which accepts flow from conduit 68 connected to the first end 16 of the zeolite adsorbent bed, but prevents reintroduction into the adsorbent bed of gas (depleted in the first component) which has flowed from the adsorbent bed through valve 288 into pump chamber 276. Pump chamber 276 discharges the oxygen depleted air through conduit 290 to discharge non-return valve 291 and discharge conduit 292, when the pressure in chamber 276 is at the second pressure slightly above atmospheric. The pump chamber 276 cooperating with valves 288 and 291 is an exhaust valved chamber (within the exhaust means) which inducts depleted feed gas at substantially the first pressure from the first end of the flow path, generates flow in the second direction during the purge step, the depleted gas mixture to the flow path, changes the pressure of the depleted gas mixture to the discharge pressure in conduit 292, and discharges the depleted gas mixture.

A compression step begins with the working pressure at the subatmospheric first pressure (typically about 40 kPa absolute pressure). The second space 51 is partially expanded as its piston is at an intermediate position, and contains gas enriched in the first component (purified oxygen). The pump chamber 276 is fully expanded as its piston is fully extended upward, and is filled with oxygen depleted air from the just completed previous purge step. Feed supply valve 272 is closed, and non-return valves 291 and 96 are held closed by the internal partial vacuum. Exhaust non-return valve 288 closes at the beginning of the compression stroke, as compression chamber 276 and second space 51 contract to raise the working pressure. Non-return valve 288 is means to prevent reintroduction of the oxygen depleted air in the pump chamber to the zeolite adsorbent bed.

As the pump chamber 276 contracts, its internal pressure reaches atmospheric pressure, and the oxygen depleted air is discharged through discharge non-return valve 291 until chamber 291 is fully contracted by maximum extension of piston 280. As the second space 51 contracts to its minimum volume, the working pressure in the second space reaches the second pressure, at or somewhat above atmospheric pressure. Some oxygen rich product gas may be discharged through product delivery valve 96.

During the feed step, working pressure is the second pressure, approximately atmospheric (unless boosted by a feed compressor 260). Feed supply valve 272 is opened. The second space 51 expands from its minimum volume to an intermediate volume while piston 60 moves upward, and draws oxygen rich gas from the second end of the adsorbent bed while feed air is drawn into the first end of the adsorbent bed through feed supply valve 272. A larger flow in the first direction through the flow path may be generated by a feed compressor 260 or a product pump 265, causing delivery of product oxygen during the feed step.

Feed supply valve 272 is closed, and continued expansion of second space 51 to its maximum volume increases the volume of the working space to reduce the working pressure back to the first pressure. The pump chamber 276 is also expanded to reduce its pressure to the first pressure, and some oxygen depleted gas may flow into the pump chamber through non-return valve 276 if the pump chamber is expanded relatively rapidly.

While pump chamber 276 continues to expand to its maximum volume, the second piston 60 reverses and begins to contract the second space 51 from its maximum volume, generating flow in the second direction in the flow path to purge the adsorbent bed. Purified oxygen flows from the second space into the second end of the adsorbent bed, and oxygen depleted air flows through non-return valve 288 into pump chamber 276, thus removing gas mixture depleted in the first component from adjacent the first end of the flow path. The apparatus then proceeds into the next compression step as reversal of the pump piston 280 causes exhaust non-return valve 288 to close.

The reciprocating drive means 65 and 285 cooperate so that volume changes in the second space 51 will have a leading phase angle with respect to volume changes in the pump chamber, while the product gas withdrawn from adjacent the second space is enriched in the (first) less readily adsorbed component. A first cyclic volume displacement means 33 from FIG. 1 could also be included in this apparatus, with a first space 31 from FIG. 1 connected to conduit 68 and thus to the first end 16 of the adsorbent bed. Then, the first cyclic volume displacement means would assist the second volume displacement means in changing the volume of the working space to accomplish pressure changes between the first and second pressures, with the penalty that a portion of the gas depleted in the first component flowing from the first end of the adsorbent bed during the purge step will enter the first space and then will be reintroduced into the adsorbent bed.

Figure 4:
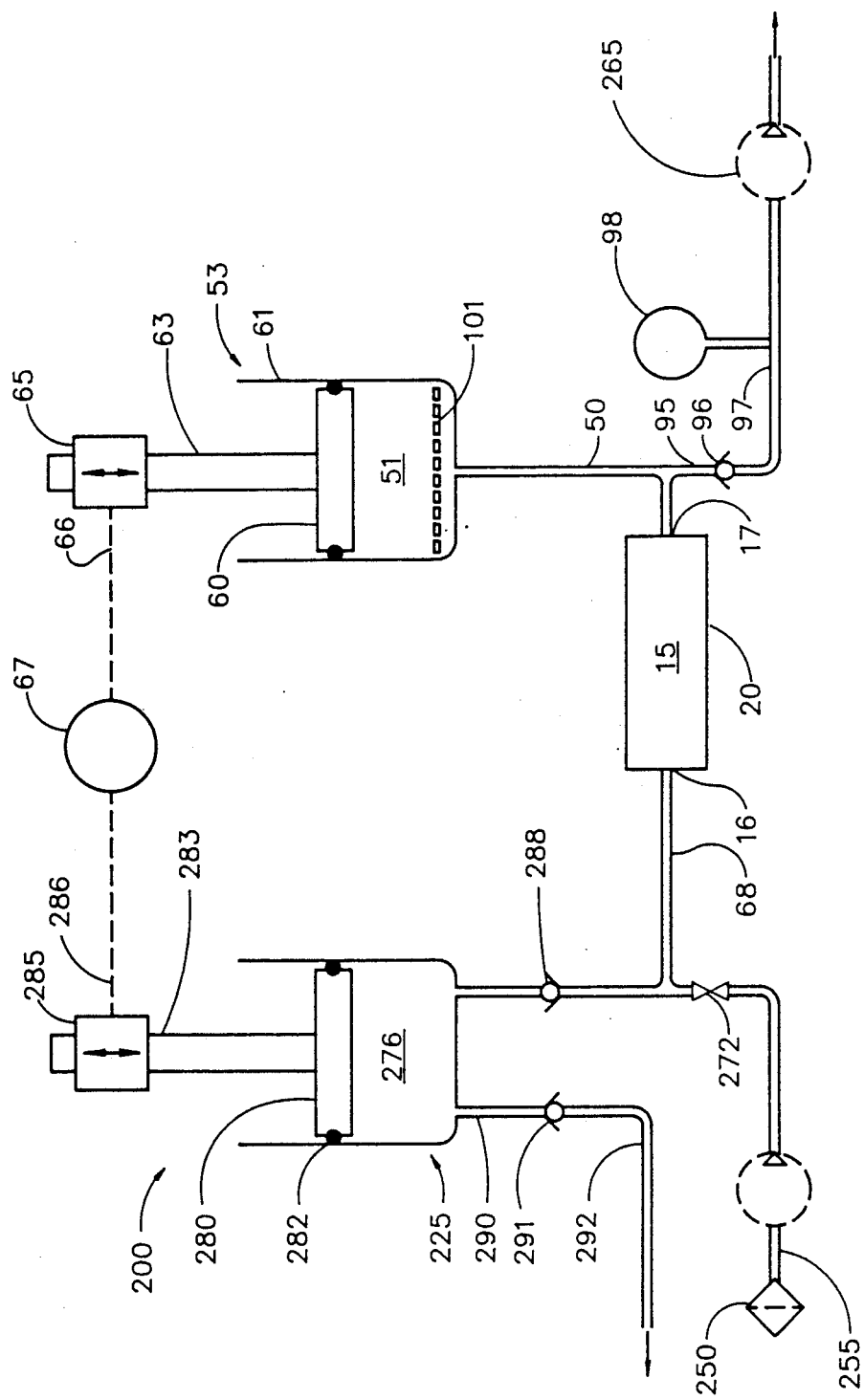
FIG. 4 shows an apparatus with a vacuum cycle for concentrating oxygen from ambient air.

In the apparatus and process as described above for FIG. 4, non-return valve 288 has prevented reintroduction of gas depleted in the first component back from the pump chamber 276 into the first end 16 of the adsorbent bed during the compression and feed steps, by preventing flow in the reverse direction from conduit 287 to conduit 68. The non-return valve 288 may be omitted if the reciprocating drive means 285 and 65 are adapted to provide (nonsinusoidal) reciprocating trajectories so that flow in the flow path at the first end 16 of the flow path will be substantially zero during the compression step (even when there is free communication between conduit 68 and the pump chamber 276), and if also the pressure in delivery conduit 97 is greater than atmospheric, so that pump chamber 276 is exhausted positively without reverse flow of gas depleted in the first component into the adsorbent bed. The piston motions must again (since the second pressure exceeds the first pressure) be coordinated such that the chamber 76 is substantially stationary at minimum volume during the expansion step, while chamber 51 is being expanded relatively rapidly. A compressor or blower 260 is then needed to pressurize the feed gas in conduit 255 so that pump chamber 276 is exhausted positively and some product gas is delivered while product delivery valve 272 is open.

The above principle may be generalized to include the case in which the first component is more strongly adsorbed than the second component, so the first pressure is higher than the second pressure. In this case, flow of depleted gas mixture into a first space (with no valves interrupting its communication with the first end of the flow path) may be prevented by keeping the first space stationary at its minimum volume while the volume of the second space is being contracted relatively rapidly during a compression step. The general statement is that flow of depleted gas mixture into a first space (communicating with the first end of the flow path) may be substantially prevented by coordinating the reciprocating drive means coupled to first and second cyclic volume displacement means (changing the volumes of the first and second spaces at first and second ends of the flow path respectiviely), so that the volume of the first space is subtantially stationary near its minimum volume, while the volume of the second space is being changed relatively rapidly so as to change the working pressure from substantially the second pressure to substantially the first pressure.

FIG. 5

A pressure swing adsorption apparatus 400 is adapted to separate and purify a first component which is a more readily adsorbed component, from a feed gas mixture containing components which are relatively more and less readily adsorbed over an adsorbent material, according to either equilibrium or kinetic sorption selectivity. The first pressure is greater than the second pressure.

The apparatus 400 includes an adsorbent bed 405 in an adsorbent bed housing 410. The adsorbent bed has a first end 411 and a second end 412. The first end 411 of the adsorbent bed is connected by conduit 415 to a feed supply valve 416 here shown as a non-return valve, connecting through conduit 415 to feed compressor 418, which may be a blower, in turn fed by inlet conduit 419. The first end 411 of the adsorbent bed is also connected through conduit 415 to an expander means 416 which removes gas depleted in the first component from adjacent the first end 411 of the adsorbent bed. The expander means is connected to conduit 415 by an exhaust valve 420, which connects to expansion chamber 425 in expansion cylinder 426. The volume of expansion chamber 425 is cyclically varied by reciprocation of expansion piston 427. Piston 427 is reciprocated at a cyclic frequency by reciprocating expander drive means 430. A discharge valve 440 is provided connecting the expansion chamber 425 to an exhaust conduit 441.

The second end 412 of adsorbent bed 405 is connected by conduit 445 to a second space 450 in second cylinder 451. The volume of second space 450 is cyclically varied by reciprocation of second piston 452. Piston 452 is reciprocated at the same cyclic frequency by reciprocating drive means 460. The expansion drive means 430 and the compression drive means 460 are coordinated so that volume displacements in expansion chamber 425 have a leading phase with respect to volume displacements in second space 450, cycling at the same frequency. The second end 412 of adsorbent bed 405 is also connected through conduit 445 to product delivery valve 470, which opens to product delivery conduit 475.

Operation of the apparatus 400 may be understood as follows. When the working pressure is at the lower second pressure, feed is introduced through open feed supply valve 416, and compressor 418 generates flow in the first direction from the first to second ends of the adsorbent bed. A portion of the gas enriched in the first component flowing from the second end 412 is drawn into the second space 450 by upwards motion of second piston 452. Some feed flow may be drawn into expansion chamber 425 (if exhaust valve 420 is opened during the feed step), by upward motion of expansion piston 427, while valve 440 is closed. Product delivery valve 470 may be opened in this step to deliver some gas enriched in the more readily adsorbed first component.

In the next step, the working pressure is elevated from the second pressure to the higher first pressure by downwards motion of the second piston 452 contracting the second space 450, and (if exhaust valve 420 was open and expansion chamber 425 was partly expanded during the feed step) of the expansion piston 427 also contracting the expansion space 425.

With the working pressure at the first pressure, the exhaust valve 420 is open during the purge step. Flow through the adsorbent bed in the second direction from second end 412 to first end 411 is induced by continued downward movement of second piston 452 and upward motion of expansion piston 427. Gas enriched in the first component that was stored in the second space flows into the second end of the adsorbent bed, while gas depleted in the first component flows from the first end of the adsorbent bed through valve 420 into the expansion chamber 425.

The working pressure is then reduced back to the second presure by upwards motion of both compression and expansion pistons. Exhaust valve 420 is closed to prevent reintroduction of gas depleted in the first component back to the adsorbent bed, and the expansion piston continues its upward movement until pressure is equalized between expansion chamber 425 and exhaust conduit 441. Discharge valve 440 is then opened, and the expansion piston moves downward to exhaust the expansion chamber completely through conduit 441. Thus, the expander means 416 is means to remove from the first portion of the working space (conduit 415) substantially all of the gas depleted in the first component that flowed from the first end of the adsorbent bed while the working pressure was substantially the first pressure and the flow in the flow path was in the second direction. If the process is operated so that exhaust valve 420 is only open when the working pressure in the flow path is at the second pressure, then the second piston 452 must change the working pressure without assistance from the expander; and the expander 416 may be generalized to operate at a different reciprocating frequency from second reciprocating drive means 460, or further generalized to be any means for withdrawing depleted feed gas from open exhaust valve 420 at substantially the second pressure.

Exhaust valve 440 is then closed, and the cycle is repeated. It will be noted that (as in previous examples) a first cyclic volume displacement means could be connected to conduit 415 at the first end 411 of the adsorbent bed, to assist the second cyclic volume displacement means in changing the volume of the working space but reducing the exchange of depleted gas mixture for fresh feed gas.

EXAMPLE NO. 3

As mentioned above, few prior art pressure swing adsorption devices have been capable of delivering the more readily adsorbed fraction as a purified product. The apparatus of FIG. 5 may be operated with a zeolite adsorbent such as molecular sieve 13X, over which nitrogen is a more relatively adsorbed component relative to oxygen and argon according to equilibrium selectivity at room temperature. The purified product delivered from conduit 475 will then be nitrogen, while enriched argon and oxygen will be delivered from exhaust conduit 450.

Figure 5:
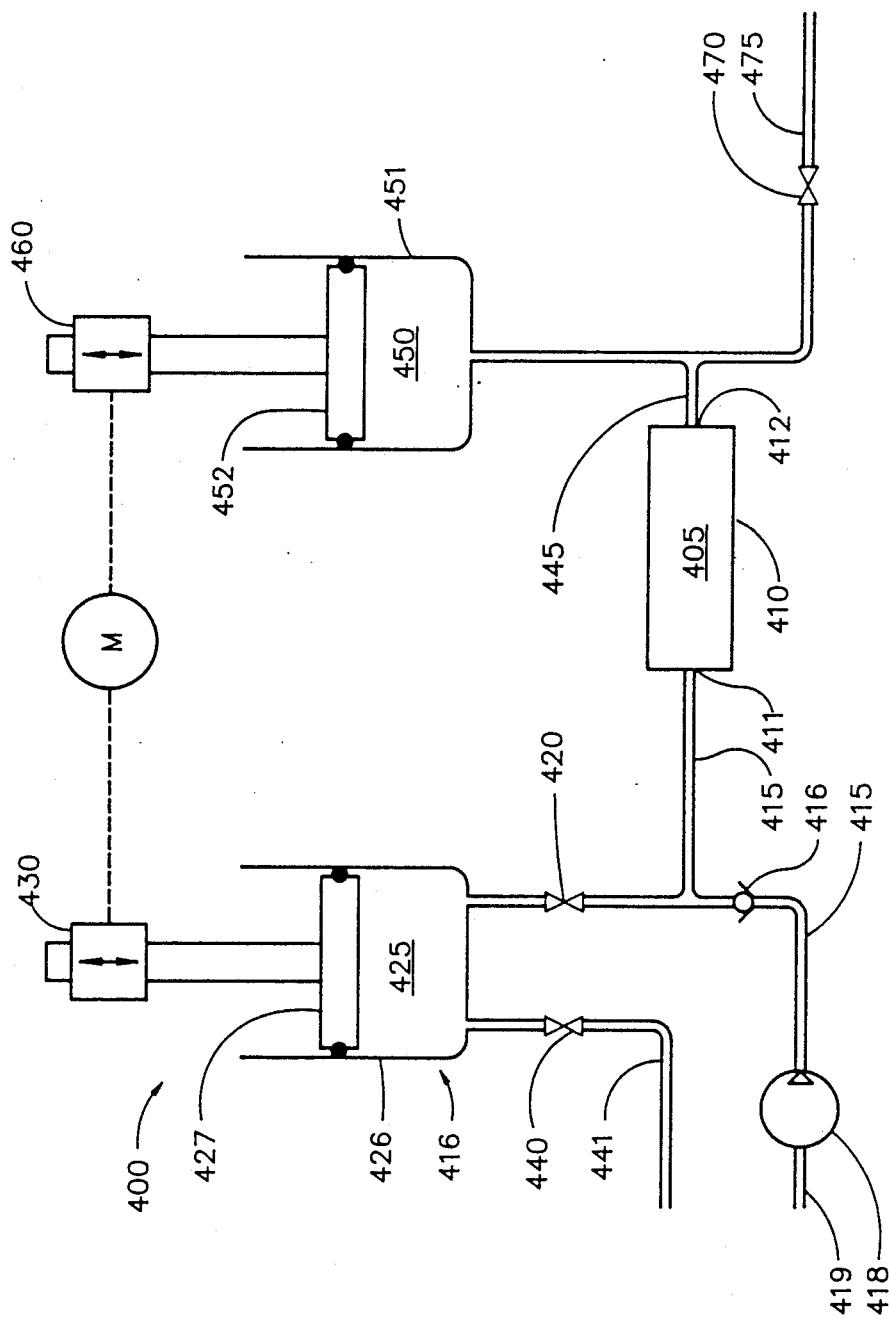
FIG. 5 shows an apparatus for concentrating and purifying the more readily adsorbed component of a gas mixture.

The apparatus of FIG. 5 may also be operated with carbon molecular sieve (or a tight pore zeolite) over which oxygen is adsorbed more rapidly than nitrogen or argon under sudden pressure rise, because the higher diffusivity of oxygen provides a kinetic selectivity according to preferential rate of sorption. When the apparatus is operated at an appropriate cycle rate enabling sufficient adsorptive uptake of oxygen but only small uptake of nitrogen, oxygen is the more readily adsorbed component relative to both nitrogen and argon. Hence, purified oxygen product is delivered from product delivery conduit 475, while enriched nitrogen and argon are delivered though exhaust conduit 450. Most prior art pressure swing adsorption air separation systems use zeolite adsorbents such as 5A or 13X for oxygen enrichment, and have been unable to purify oxygen to greater than about 95% purity because the equilibrium separation concentrates argon with the oxygen.

EXAMPLE NO. 4

Hydrogen flowing through a chemical process loop may contain more readily adsorbed impurities such as carbon dioxide which must be purged. The embodiment of FIG. 5 may be applied to concentrating the impurities and recovering hydrogen from the concentrated impurities, if high purity of the hydrogen returned to the process loop is not required. A suitable application may be purging of carbon dioxide and other impurities from hydrogen circulating on the anode side of a phosphoric acid fuel cell or solid polymer electrolyte fuel cell, so that essentially all of the hydrogen may be consumed as fuel in the fuel cell. These types of fuel cell do not require high purity hydrogen over the anode, but the purged impurities must be stripped of hydrogen if high efficiency is to be achieved.

In this example, impure hydrogen is removed from the process loop and introduced to the apparatus through inlet conduit 419. Hydrogen depleted in impurities (but not stringently purified) is returned to the process loop through exhaust conduit 441. The concentrated impurities from which hydrogen has been relatively stringently removed are delivered through product delivery conduit 475. Here, hydrogen is a less readily adsorbed second component and carbon dioxide is a more readily adsorbed first component.

The apparatus of FIG. 5 is not capable of purifying hydrogen to a high degree, as would be required for an alkaline fuel cell whose electrolyte reacts undesirably with carbon dioxide. However, the present invention can be adapted to achieve complete separation of binary mixtures and thus to achieve simultaneously high purity and recovery of hydrogen. This is done by combining an apparatus for purifying the less readily adsorbed component (as in FIG. 1) with an apparatus for purifying the more readily adsorbed component (as in FIG. 5), within a single working space as shown in FIG. 6.

FIG. 6

Figure 6:
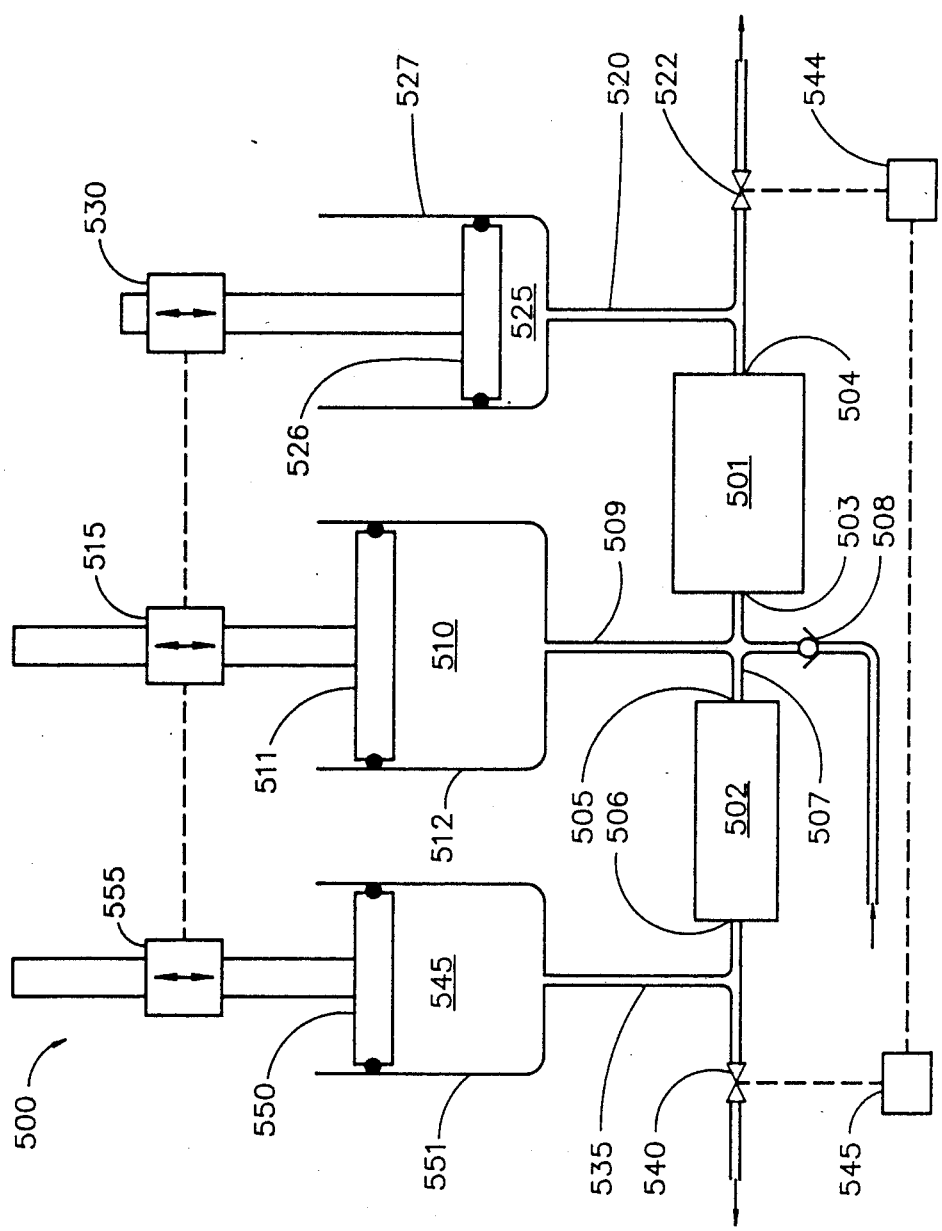
FIG. 6 shows an integrated double apparatus for purifying both the more readily adsorbed and less readily adsorbed components of a gas mixture.

The apparatus 500 of FIG. 6 has a first adsorbent bed 501 and a second adsorbent bed 502. First adsorbent bed 501 has a first flow path with a first end 503 and a second end 504. Second adsorbent bed 502 has a second flow path with a first end 505 and a second end 506. First ends 503 and 505 of the two adsorbent beds are connected by conduit 507. A feed mixture containing a less readily adsorbed component (e.g., hydrogen) and a more readily adsorbed component (e.g., carbon dioxide) is introduced to conduit 507 and thus to the first ends of the adsorbent beds by feed supply valve 508 from a feed source.

Conduit 507 interconnecting the first ends of the two adsorbent beds is also connected by conduit 509 to a first space 510, whose volume is cyclically changed by a first cyclic volume displacement means provided as first piston 511 reciprocating in first cylinder 512. The first piston 511 is reciprocated at a cyclic frequency by a first reciprocating drive means 515.

The second end 504 of the first adsorbent bed is connected by conduit 520 to a first product delivery valve 522 and to a second space 525, whose volume is cyclically changed by a second cyclic volume displacement means provided as second piston 526 reciprocating in second cylinder 527. The second piston 526 is reciprocated at the same cyclic frequency by a second reciprocating drive means 530 cooperating with the first drive means 515.

The second end 506 of the second adsorbent bed is connected by conduit 535 to second product delivery valve 540 and to a third space 545, whose volume is cyclically changed by a third cyclic volume displacement means provided as third piston 550 reciprocating in third cylinder 551. The third piston 550 is reciprocated at the same cyclic frequency by a third reciprocating drive means 555 cooperating with the first and second reciprocating drive means. The working space of the apparatus includes both adsorbent beds; and the first, second and third spaces respectively.

Operation of the apparatus will now be described, so that the less readily adsorbed component (hydrogen) will be delivered as a purified first component from first product delivery valve 522, while the more readily adsorbed component (carbon dioxide) will be delivered as a purified second component from second product delivery valve 540. This result will be achieved when the working pressure in the working space cycles between a higher second pressure and a lower first pressure with flows imposed by the relative phasing of the reciprocating pistons such that when the working pressure is substantially the second pressure, the gas mixture in the flow paths flows in a first direction from the first end to the second end of the first adsorbent bed and from the second end to the first end of the second adsorbent bed, so that gas enriched and purified in the first component flows into the first second space which is expanding, while gas which was previously enriched in the second component flows out of the third space which is contracting.

When the working pressure is substantially the first pressure, gas mixture in the flow paths flows in a second direction reverse to the first direction, so that gas that was enriched and purified in the first component flows into the second end of the first adsorbent bed from the second space which is contracting, gas mixture depleted in the first component flows from the first end of the first adsorbent bed into the first end of the second adsorbent bed, and gas enriched and purified in the second component flows into the third space (which is expanding) from the second end of the second adsorbent bed.

The reciprocating drive means are operated so that volume changes in the second space have a leading phase with respect to volume changes in the first and third spaces. Volume changes in the first space may be approximately in phase with volume changes in the third space, or may be approximately in inverse phase with the changes in working pressure, so that the first space has maximum (minimum) volume when the working pressure is minimum (maximum).

For the important case in which the more readily adsorbed component is a relatively small fraction of the feed mixture, it will often be appropriate for the first adsorbent bed to be larger in cross-section and design flows than the second adsorbent bed in order to avoid expending an excessive separation effort on concentrating the smaller fraction. Then the above specified cyclic pressure and flow regime can be achieved using a relatively large swept volume displacement for the first space 510, and smaller swept volume displacements for the second space 525 and third space 545 as shown in FIG. 6.

It will be seen that the second adsorbent bed serves as means to remove gas depleted in the first component from the first portion of the working space, which has flowed from the first end of the first adsorbent bed when the working pressure was substantially the second pressure, and the flow in the flow path was in the second direction. Gas mixture, subsequently flowing back from the first end of the second adsorbent bed into the first end of the first adsorbent bed) when the working presure is substantially the first pressure and the flow is in the first direction, will be relatively enriched in the first component and will blend with fresh feed gas having a similar composition. Thus, the second adsorbent bed removes the second component (to form the second product removed from second product valve 540) and prevents accumulation of the second component in the first portion of the working space. Similarly, the first adsorbent bed prevents accumulation of the first component adjacent the first end of the second adsorbent bed.

In order to achieve highest purity of the first and second products, cooperating first valve control means 544 over the first product delivery valve 522 and second valve control means 545 over the second product delivery valve 540 are provided. If the feed composition is fixed and known, and high purity is attainable, the first and second valve control means may cooperate to meter the mass flows of first and second products, in ratio to the composition ratio of first and second components in the feed. Otherwise, the first and second valve control means may sense the purity of their respective products, with logic to prevent flow of product failing to meet desired purity.

EXAMPLE NO. 5

The apparatus of FIG. 6 may be used to achieve substantially complete separation of binary mixtures where one or both components is either valuable or toxic so that simultaneous high purity and high recovery are required. A frequent application is removal of small amounts of more readily adsorbed impurities from a valuable less readily adsorbed gas such as hydrogen or helium. Helium purification is important both in diving breathing gas applications and in purging atmospheric contamination from helium feed to cryogenic equipment.

The ability to purify a relatively large stream of the less readily adsorbed product in the larger first adsorbent bed, while expending a comparatively small effort in concentrating a volumetrically minor stream of more readily adsorbed impurities in the smaller second adsorbent bed, is an important advantage relative to the prior invention of Keller (U.S. Pat. No. No. 4,354,859) which also can approach complete separation of a binary mixture, but is more suitable for applications in which the more readily adsorbed component predominates.

FIG. 7

Figure 7:
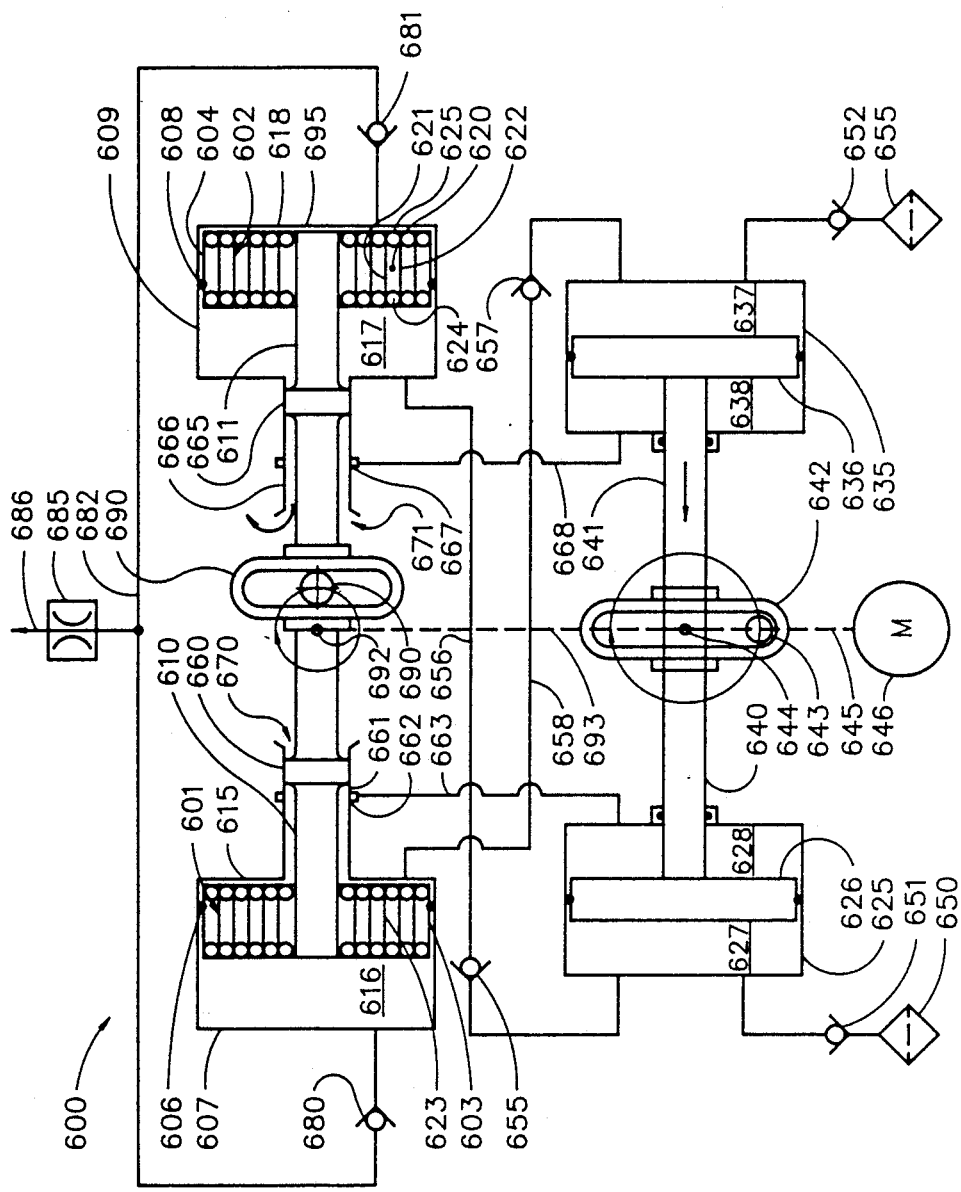
FIG. 7 shows a gas separation apparatus with valved compression and expansion chambers.

As the above descriptions have included no details of specific mechanisms, FIG. 7 is provided to show a more detailed specific embodiment of the invention in the particular application of concentrating oxygen from atmospheric air. The apparatus 600 includes two identical oxygen concentration units, operating 180 degrees out of phase to provide smoother operation with recovery of work of expansion from each unit to provide work of compression for the other unit. For air separation to purify oxygen as the less readily adsorbed component, a suitable adsorbent material is zeolite 13X. The apparatus will be described according to the left and right sides of FIG. 7.

Apparatus 600 has a left adsorbent bed 601 and a right adsorbent bed 602. Each of the adsorbent beds is mounted within a displacer piston attached to a common piston rod. Thus the left adsorbent bed 601 is mounted within left displacer piston 603, and the right adsorbent bed is mounted within right displacer piston 604. Left displacer piston reciprocates with sealing means 606 in left displacer cylinder 607, and right displacer piston reciprocates with sealing means 608 in right displacer cylinder 609. Left and right displacer pistons 603 and 604 are reciprocated by left displacer piston rod 610 and right displacer rod 611 respectively, whose cross section area is much smaller than that of the of the displacer cylinders.

The displacer pistons divide the internal space of their cylinders into a first space adjacent the displacer rod, and a second space opposite the displacer rod. Thus, left displacer cylinder has first space 615 and second space 616, and right displacer cylinder has first space 617 and second space 618. The first and second spaces of each displacer cylinder communicate through channels 620 in the adsorbent bed in each displacer piston. These channels may comprise a plurality of identical narrow passages lined with adsorbent material, with a flow direction parallel to the axis of the displacer pistons. Such channels may be provided for example by honeycomb monoliths.

In a preferred adsorbent bed configuration, the channels 620 are the gaps between adjacent layers (e.g.) 621 and 622 of a spiral roll wound from a ribbon of sheet material 623 supporting the adsorbent material. The gap width in the spiral roll is controlled accurately by spacers, which may be porous or perforated spacers 624 and 625 on each edge of the ribbon defining the first and second ends of the passages respectively. The ribbon with spacers is wound around the displacer piston rod to form the spiral roll, which with an annular seal 606 or 608 serves as a displacer piston 603 or 604.

It will be noted that the alternative honeycomb or spiral roll adsorbent configurations provide a uniform distribution of substantially identical channels across the width of the displacer piston, and thus are means to provide uniform distribution of flow between the second end of the adsorbent bed and the corresponding second space, across the width of the second space transverse to the flow direction. In this configuration, the flow direction in the second space is parallel to the direction of displacer piston reciprocation. The transverse uniformity of flow distribution across the second space will minimize turbulent mixing in the second space, so that gas discharged into the second space will remain stratified (in the axial flow direction) according to the time of entering the second space from the adsorbent bed. Since purity of the gas discharged into the second space (enriched in the first component) will vary over different times of the cycle, the desired stratification will inhibit mixing of more and less pure product gas, so that the most pure product gas can be withdrawn through the product delivery valve, and the less pure product gas can be returned to the adsorbent bed for purge and further purification.

The apparatus also includes left and right double-acting feed cylinders, with each cylinder incorporating a compression chamber and an expansion chamber on opposite sides of a piston. Each piston is reciprocated by a piston rod connected by a connecting rod to a rotating crank. Thus, left feed cylinder 625 is divided by left piston 626 into left compression chamber 627 and right expansion chamber 628. Right feed cylinder 635 is divided by right piston 636 into a right compression chamber 637 and a right expansion chamber 638. Left piston 626 is reciprocated by left piston rod 640, and right piston 636 is reciprocated by right piston rod 641. The piston rods are reciprocated in opposite phase, in this example by a scotch yoke 642 attached to piston rods 640 and 641. Scotch yoke 642 is reciprocated by a crank pin 643, which is rotated about an offset fixed centre of rotation 644 by a clockwise rotating shaft 645 driven by motor 646.

Feed air is introduced to the left compression chamber 627 through inlet filter 650 and suction non-return valve 651, and to the right compression chamber 637 through inlet filter 655 and suction non-return valve 652. Feed air compressed to the elevated second pressure is delivered from left compression chamber 627 through feed supply non-return valve 655 and conduit 656 to the right first space 617, and from the right compression chamber 637 through feed supply non-return valve 657 and conduit 658 to left first space 615.

Sealing of left displacer piston rod 610 in left first space 615 is achieved by a left exhaust valve piston 660 which is mounted on left displacer piston rod 610, and reciprocates with a sealing fit within left exhaust valve sleeve 661 which is perforated by left exhaust valve port 662. At approximately the midpoint of its reciprocating travel, left exhaust valve piston 660 passes over left exhaust valve port 662, which is connected by conduit 663 to left expansion chamber 628. Similarly, right exhaust valve piston 665 is mounted on right displacer piston rod 611, and reciprocates with a sealing fit in right exhaust valve sleeve 666 which is perforated by right exhaust valve port 667, in turn connected by conduit 668 to right expansion chamber 638.

In the position of the apparatus shown in FIG. 7, oxygen depleted air is being exhausted from left first space 615 through open left exhaust valve port 662 and conduit 663 to left expansion chamber 628. The oxygen depleted air will be subsequently discharged from the left expansion chamber through discharge port 670 (here exhausting to atmosphere), when left exhaust valve piston 660 has shifted across port 662 to open conduit 663 to exhaust port 670. The right side of the apparatus is shown in the process of exhausting oxygen depleted air from right expansion chamber 638 through conduit 668, exhaust valve port 667, and right discharge port 671.

Oxygen enriched product is delivered from left second space 616 through product delivery valve 680 and from right second space 617 through product delivery valve 681. The product delivery valves deliver the oxygen enriched product gas into product delivery manifold 682, whose internal pressure is maintained at substantially the second pressure by product pressure regulation means 685 as the product is delivered through conduit 686 to its user.

Left displacer piston rod 610 and right displacer piston rod 611 are reciprocated in opposite phase by scotch yoke 690, which in turn is reciprocated by crank pin 691 revolving about fixed offset center 692. Crank pin 691 is rotated by shaft 693, which is driven by motor 646 and defines the relative phase between crank pins 691 and 643, here shown as about 90 degrees lead for crank pin 691 relative to crank pin 643. It may be noted that pressure differences between second spaces 616 and 618, acting on the projected areas of the displacer piston rods 610 and 611 in opposition, will provide a force assisting to drive the displacer pistons. If the exhaust valves were provided and actuated separately from the displacer piston drive mechanism, internal pressure forces could drive the displacer piston assembly as a free piston with no mechanical drive. Friction of sliding seals and inertia of the displacer piston assembly (including both displacer pistons and the displacer piston rod) would cause the motion of the displacer pistons to lag the actuating pressure difference between left and right sides, with a desired phase relationship if the apparatus is driven at an appropriate speed. The inertial mass of the displacer piston assembly (whether a free piston or mechanically driven) will provide cyclic storage of some work of expansion which is returned to the apparatus as work of compression.

The operation of apparatus 600 may be understood by following the steps of a cycle. In the position of the apparatus as shown, pistons 626 and 636 are moving leftward. Displacer pistons 603 and 604 are at their extreme rightward positions. Feed air in left compression chamber is being compressed, and flowing through non-return valve 655 to pressurize the right displacer cylinder 609. Simultaneously, left displacer cylinder 607 is being depressurized by the increasing volume of left expansion chamber 628, connected through open exhaust valve port 662. While non-return valve 657 is closed, feed air is drawn into right compression chamber 637 at low pressure through open non-return valve 652. Low pressure oxygen depleted air is exhausted from right expansion chamber 638 through exhaust valve port 667 open to discharge port 671.

As the cranks rotate beyond the position shown, the displacer piston assembly will begin to move leftward. The pressure in the right displacer cylinder is near maximum at the second pressure. Purified oxygen will flow into right second space 618, with initially higher purity. As right displacer piston 604 moves further leftward, oxygen flowing into the right second space 618 will be less pure owing to partial breakthrough of the nitrogen mass transfer zone. Because of the transversely uniform flow distribution of the oxygen enriched gas into the second space, the purest oxygen will remain stratified at the product delivery end 695 of right second space 618.

The working pressure over the left adsorbent bed is the first pressure which is approximately atmospheric pressure. Since the pressure over the right adsorbent bed is relatively elevated, there is a pressure imbalance helping drive the displacer assembly leftward. As the left displacer piston 603 moves leftward, oxygen of progressively greater purity (due to stratification) flows through the left adsorbent bed from the left second space 616 at low pressure, thus purging the bed.

As the displacer piston assembly moves leftward, it passes the midpoint of its reciprocating travel. Exhaust valve pistons 660 and 665 cross their respective exhaust valve ports 662 and 667, reversing the exhaust valve positions so that conduit 663 is opened to exhaust port 670, and conduit 668 is opened to right first space 617. Pistons 626 and 636 reach their extreme leftward position and reverse rightward at about the same time. The working presssure over the right adsorbent bed now decreases owing to volume increase in expansion chamber 638, while working pressure over the right adsorbent bed increases owing to volume decrease in compression chamber 637. The apparatus then proceeds through a second half half cycle, in which the roles of left and right components are inverted to complete the full cycle.

In the apparatus and process of FIG. 7, the expansion chambers with their associated exhaust valves are exhaust valved chambers serving as exhaust means, removing, depressurizing and discharging depleted gas mixture from the first space associated with each adsorbent bed. Likewise, the compression chambers cooperating with their non-return valves are compression valved chambers or feed supply means, inducting feed gas mixture at the feed pressure (which coincides approximately with the discharge pressure and with the first pressure), and delivering the feed gas mixture to the first end of the flow path at the second pressure. The compression valved chamber cooperating with each adsorbent bed pumps feed air into the working space during the compression step, while the expansion chamber is disconnected from that adsorbent bed while the pressure is rising. As the working pressure passes its maximum, the fully contracted compression valved chamber is disconnected by closure of the feed supply valve (non-return valve 655 or 657), and the exhaust valve opens an expansion chamber which has contracted to its minimum volume. Hence, the compression chamber is connected to the adsorbent bed while the pressure is rising and the flow is in the first direction, while the expansion chamber is connected while the pressure is decreasing and the flow is ion the second direction. With this coordination between the feed supply means and the exhaust means, exchange of feed gas for depleted gas is established.

In the apparatus as described, only a portion (typically about 50% or somewhat less) of the oxygen depleted air that enters the first space from the adsorbent bed during each purge step will be removed into the corresponding expansion chamber, because the displacer configuration requires the use of approximately equal displacement first and second spaces, and the first space is partly expanded when the compression chamber exchanges with an expansion chamber communicating with the first end of the flow path. Hence there will be some accumulation of nitrogen and of water vapour in the second space, limited by the rate of exchange between depleted and fresh feed air. Deactivation of the zeolite adsorbent may be prevented by using relatively large displacement compression and expansion chambers (relative to the volume of the working space within the displacer cylinders), by warming of the compressed feed air by heat of compression, and by using alumina rather than zeolite adsorbent in a short section of each adsorbent bed adjacent the first space to prevent penetration of water into the main portion of the flow path contacting the zeolite adsorbent.

In this embodiment, volume variations of the working space within the displacer cylinder are relatively small. Pressure changes are achieved by volume changes in compression and expansion chambers alternatingly connected to each first space, and the working space associated with each adsorbent bed will be taken as including the compression chamber or expansion chamber that is in communication with the first end of that adsorbent bed (through an open valve) at any given instant.

FIG. 8

Figure 8:
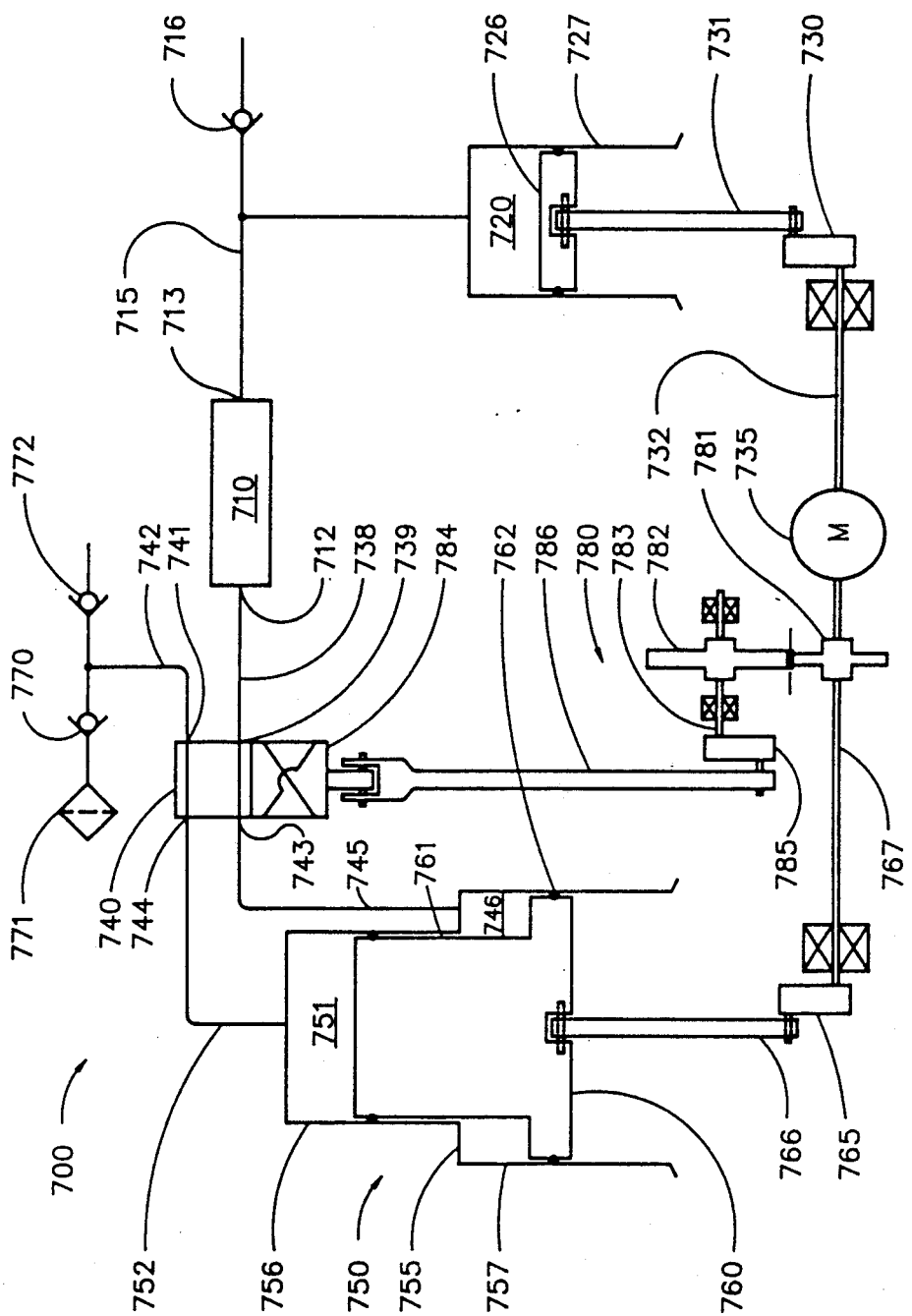
FIG. 8 shows a gas separation apparatus adapted for substantially complete exchange of depleted feed gas.

FIG. 8 shows an embodiment 700 of the invention also using directional valving to exchange chambers connected to the first end of the adsorbent bed, so as to remove gas depleted in the first component entirely before introducing feed gas in another chamber. This embodiment is logically analogous to a four-stroke internal combustion engine, which likewise avoids mixing of exhaust gas with fresh feed gas.

An adsorbent bed 710 has a flow path with a first end 712 and a second end 713. Second end 713 is connected by conduit 715 to a product delivery valve 716 and a second space 720 whose volume is changed by a second cyclic volume displacement means 725, here shown as piston 726 reciprocating in cylinder 727. Piston 726 is reciprocated at a cyclic frequency by a rotating crank 730, connected to piston 726 by connecting rod 731.

Crank 730 is rotated by a shaft 732 rotating about a fixed axis and driven by motor 735.

The first end 712 of adsorbent bed 710 is connected by a conduit 738 to a first port 739 of a four-way valve 740 which combines the functions of a feed supply valve and an exhaust valve. Second port 741 of four-way valve 740 is connected to feed conduit 742. Four-way valve 740 connects the first and second ports alternatingly to a third port 743 and a fourth port 744. Third port 743 is connected by conduit 745 to a first chamber 746 of a feed cyclic volume displacement means 750 also having a second chamber 751, which is connected by conduit 752 to fourth port 744 of the four-way valve 740. The first chamber 746 and second chamber 751 have substantially equal displacements. The volumes of first chamber 746 and second chamber 751 are varied in the same reciprocating phase, so that they are both maximum (minimum) simultaneously.

In FIG. 8, the feed cyclic volume displacement means 750 is shown as a stepped cylinder 755 having a smaller cylinder portion 756 and a larger cylinder portion 757. The cross-section area of larger cylinder portion 757 is approximately twice that of smaller cylinder portion 756. Stepped piston 760 reciprocates in stepped cylinder 755 at the cyclic frequency, and has an inner piston portion 761 forming a sealing fit in the smaller cylinder portion 756 to define the second chamber 751. Stepped piston 760 also has an outer piston portion 762 forming a sealing fit in the larger cylinder portion 756, to define the first chamber 746 in the annulus between inner and outer piston portions. Stepped piston 760 is reciprocated by rotating crank 765, connected through connecting rod 766. Crank 765 is rotated by shaft 767 extended from shaft 732.

In the position of four-way valve 740 as shown in FIG. 8, the first port 739 is connected to the third port 743, and the second port 741 is connected to the fourth port 744. Thus, the first end of the adsorbent bed communicates with the first chamber 746, while the second chamber 751 communicates with the feed conduit 742. In the reversed position of four-way valve 740, the first port is connected to the fourth port, and the second port is connected to the third port. Then, the first end of the adsorbent bed is connected to the second chamber, and the first chamber is connected to the feed conduit 742.

In order to avoid mixing of feed and depleted gas streams, feed conduit 742 is connected through inlet non-return valve 770 to inlet filter 771, and is also connected to discharge valve 772. The internal volume of conduits 738, 742, 745 and 752 should be minimized to reduce dead volume.

Four-way valve 740 is actuated by a valve actuation linkage 780 including a first timing gear 781 on the drive shaft 767. First timing gear 781 drives a second timing gear 782 on timing shaft 783. Second gear 782 has twice as many teeth as first gear 781, so timing shaft 783 rotates around its fixed axis with an angular velocity exactly half that of drive shaft 732. If four-way valve 740 were a rotary valve, it could be driven directly by timing shaft 783. Assuming that four-way valve is a spool valve requiring linear actuation, valve spool 784 is reciprocated through connecting rod 785 by rotating crank 786 on timing shaft 783. Thus, four-way valve reciprocates between its two positions at half the cyclic frequency of the reciprocating pistons. The phase of crank 786 relative to crank 765 is set so that the four-way valve shifts between its two positions at the instant of zero flow through valve 740 (when the flow direction is reversing at the first end of the adsorbent bed), near the bottom dead centre of crank 765 when the volume of first and second chambers 746 and 751 is maximum. Thus, gas (depleted in the first component) flowing from the first end of the flow path in the second direction during a purge step will flow into one of the first or second chambers according to the position of four-way valve 740, while feed gas is flowing into the other chamber through inlet valve 770. When the chambers are substantally expanded and filled with depleted gas mixture and fresh feed gas respectively, the four-way valve shifts to its opposite position. The chambers then contract, so that the chamber filled with depleted gas mixture discharges through discharge valve 772, and the chamber filled with fresh feed gas is connected to the working volume of the apparatus and supplies the fresh feed gas to the first end of the adsorbent bed.

The phase relation between cranks 730 and 765 depends on whether the first component being concentrated to the second end of the adsorbent bed is a more readily or less readily adsorbed component. If the first component is less readily adsorbed, crank 730 will have a leading phase relative to crank 760, so that flow in the first direction (delivering gas enriched in the first component to the second space) will occur at the second pressure which is then higher than the first pressure, when the total volume of the working space including a communicating chamber of the feed cyclic volume displacement means is near minimum. The working pressure will be rising from the first pressure when the flow reverses at the first end of the adsorbent bed after a purge step and four-way valve 740 shifts.

If the first component is more readily adsorbed, crank 730 will have a lagging phase relative to crank 765, so that flow in the first direction will occur at the second pressure which is then lower than the first pressure, when the total volume of the working space including a communicating feed chamber is near maximum. The working pressure will be dropping from the first pressure when the flow reverses at the first end of the adsorbent bed after a purge step and four-way valve 740 shifts.

With the four-way valve in the position shown, first chamber 746 is effectively included in the working space and contributes to volume changes causing the working pressure to change between the first and second pressures, while second chamber 751 is discharging depleted gas and then inducting fresh feed gas. After the valve 740 shifts, the first and second chambers will interchange roles communicating with the adsorbent bed and exchanging feed gas during the next cycle. The first and second chambers thus communicate with the working space during alternating cycles. The first and second chambers cooperating with four-way valve 740 are valved chambers serving as means to remove from the first space substantially all of the gas mixture depleted in the first component that has flowed from the first end of the adsorbent bed during the purge step, and substantially preventing reintroduction of the depleted gas mixture to the adsorbent bed. If the adsorbent beds were in a displacer configuration (as in FIG. 7), this system for exchanging feed gas mixture for depleted gas mixture would be unable to achieve complete exchange because of the mixing occuring in the first spaces of the displacer cylinder. Conversely, the cooperating feed supply means and exhaust means of FIG. 7 could approach complete exchange of feed gas for depleted gas mixture, by eliminating the displacer configuration and its large first space exactly as has been done in FIG. 8.

FIG. 9

Figure 9:
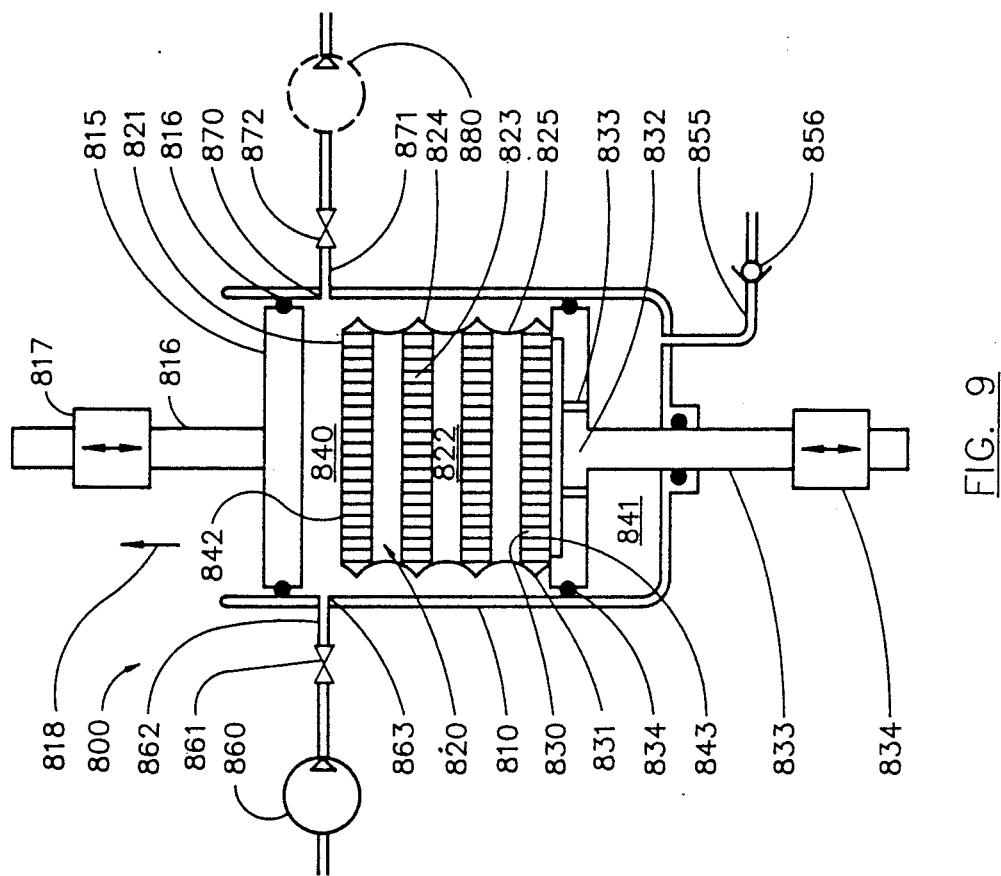
FIG. 9 shows a gas separation apparatus with excess feed pumping for removing depleted feed gas.

FIG. 9 shows an embodiment of the invention, with means to exchange fresh feed gas for depleted gas related to a two-stroke internal combustion engine. The arrangement shown uses a displacer piston to mount a moving adsorbent bed, as in FIG. 7. The adsorbent bed also is illustrated as comprising several sections which can move relatively to change the volume of spaces at intermediate portions of the flow path.

Apparatus 800 includes a cylinder 810 enclosing the working space, whose volume is varied by a cyclic volume displacement means provided as piston 815. Piston 815 has sealing ring 816, and is reciprocated through piston rod 816 by a first reciprocating drive means 817. Cylinder 810 is mounted with its axis vertically oriented as shown by arrow 818 directed upward.

Adsorbent bed assembly 820 is shown as comprising four identical adsorbent bed portions 821, separated by three intermediate spaces 822. Each adsorbent bed portion 821 is formed as a disc containing the adsorbent material, with multiple parallel flow passages 823 contacting the adsorbent material and providing flow communication between the faces of the disc. Each adsorbent bed portion 821 is mounted in a circumferential support ring 824, and the support rings of adjacent adsorbent bed portions are connected by resilient material 825 which maintains approximately equal relative spacing of the adsorbent bed portions. In the illustrated embodiment, resilient material 825 is a flexible bellows which also provides peripheral sealing means to prevent bypassing of any adsorbent bed portion by axial flow through another adsorbent bed portion. (Alternatively, each adsorbent bed portion could have a sealing ring on support ring 824, sealing directly on cylinder 810.)

An end adsorbent bed portion 830 is attached by its support ring 831 to displacer piston 832. Displacer piston 832 is perforated by flow passages 833 communicating through the displacer piston to end adsorbent bed portion 830, and is sealed against cylinder 810 by sealing ring 834. Displacer piston 832 and the attached adsorbent bed assembly 820 separate the working space between a first space 840 (the first portion of the working space) between the adsorbent bed and the piston 815, and a second space 841 (the second portion of the working space) below displacer piston 832. It is seen that a flow path is provided through passages 833, the flow passages 823 through the adsorbent bed portions, and the intermediate spaces 822. This flow path through the adsorbent bed assembly 820 communicates at its first end 842 with the first space 840, and at its second end 843 with the second space 841.

When the flow of gas in the flow path is directed in a first direction from the first space to the second space, forces due to frictional pressure drop across the adsorbent bed portions tends to collapse the adsorbent bed assembly downward against the displacer piston 832, with assistance from the weight of the adsorbent bed portions, so as to contract the intermediate spaces 822 to their minimum volumes. When the flow of gas in the flow path is directed in a second direction from the second space to the first space, forces due to frictional pressure drop tend to expand the bed (overcoming weight of the adsorbent bed portions), so as to expand the intermediate spaces 822 to their maximum volumes limited by restraint of elastic material 825.

Gas flow in the flow path is generated primarily by moving the displacer piston, upward to expand the second space 841 while generating flow in the first direction, and downward to contract the second space 841 while generating flow in the second direction. While the displacer piston is reversing from upward motion to downward motion, inertial effects on the adsorbent bed portions will tend to expand the adsorbend bed assembly which was contracted during upward motion. While the displacer piston reverses from downward motion to upward motion, inertial effects will tend to contract the adsorbent bed assembly which was expanded during downward motion.

Displacer piston 832 is reciprocated through displacer piston rod 850 by displacer reciprocating drive means 851, which cooperates with first drive means 817 so that piston 815 and displacer piston 832 both reciprocate at the same cyclic frequency and with a phase relation such that the volume of the working space (including the first and second spaces, and the adsorbent bed assembly) is minimum when the contracted adsorbent bed assembly and displacer piston are moving upward to generate flow through the flow path in the first direction; and the volume of the working space is maximum when the expanded adsorbent bed assembly and displacer piston are moving downward to generate flow in the second direction within the flow path. Then the working pressure is the higher second pressure when the flow in the flow path is in the first direction, so that purified oxygen flows into the second space; and the working pressure is the lower first pressure when the flow in the flow path is in the second direction, and previously purified oxygen flows into the second end 843 of the flow path while oxygen depleted air flows from the first end 842 of the flow path into the first space 840.

It is seen that the intermediate spaces 822 in the flow path are relatively expanded when the working presure is lowest, and relatively contracted when the working pressure is highest. This expansion and contraction of the adsorbent bed compensates the effects of compressibility and adsorption/desorption as the pressure is changed between first and second pressures; and provides the benefit of reducing flow in the flow path within the adsorbent bed while the pressure is changing intermediate between the first and second pressures.

Purified oxygen is withdrawn from the second space 841 through conduit 855 and product delivery valve 856. Feed air is provided by a feed pump 860 through feed supply valve 861, connected by feed conduit 862 to feed port 863 in cylinder 810. Oxygen depleted air, mixed with some excess feed air from feed pump 860, is removed through exhaust port 870, connected by exhaust conduit 871 to exhaust valve 872. Feed air is introduced through feed port 873 into the first space 840 when feed supply valve 861 is open. While feed air is being introduced into the first space, exhaust valve 872 is open to discharge excess gas from the first space 840 through exhaust port 870. The first space is configured so that excess feed air flowing into the first space is effective in scavenging oxygen depleted air which has flowed from the adsorbent bed. The fraction of the oxygen depleted air which is removed through the exhaust valve may be in the range of 20% to 80% of the depleted gas which has flowed from the first end of the adsorbent bed into the first space, the balance mixing with the feed air to flow back into the adsorbent bed. Feed pump 860 may be a blower, or may be a reciprocating pump associated with the first reciprocating drive means, and is a feed supply means.

Apparatus 800 as described may be used in a vacuum or pressurized cycle. In a vacuum cycle, the first pressure is subatmospheric, while the second pressure would be somewhat above atmospheric, as determined by the delivery pressure from feed pump 860. In the vacuum cycle, feed supply valve 861, exhaust valve 872, and product delivery valve 856 are opened when the working pressure is substantially the second pressure, and are otherwise closed. The exhaust valve should be opened before the feed supply valve, so that some oxygen depleted gas may be expelled by piston 815 from the first space 840 before introduction of fresh feed air.

In a pressurized cycle using apparatus 800, the first pressure is approximately atmospheric, as determined by feed pump 860 (or an optional exhaust pump 880 connected to exhaust valve 872); and the second pressure is elevated to a few atmospheres. Feed supply valve 861 and exhaust valve 872 are opened when the working pressure is the first pressure; and the product delivery valve may be opened when the working pressure is the second pressure. Since piston 815 is near its upper position when the working pressure is the lower first pressure, it may cross over feed port 863 and exhaust port 870, so that the feed and exhaust ports are open to the first space 840 when piston 815 is at its upper position, and are closed from the first space 840 when piston 815 has moved downward into cylinder 810 to contract the working space and increase the working pressure. The action of piston 815 crossing feed port 863 is equivalent to a feed supply valve, so a separate feed supply valve 861 is redundant. Similarly, the action of piston 815 crossing exhaust port 870 is equivalent to an exhaust valve, so that separate exhaust valve 872 may be omitted.

It will be understood that the inclusion of a variable geometry adsorbent bed assembly with intermediate spaces 822, and the mounting of the adsorbent bed on a moving displacer piston separating first and second spaces, are optional features which could also be used in other embodiments. These features are independent of the described method of exchanging fresh feed gas for depleted gas mixture, using a valved first space as the feed chamber and exhaust chamber. A similar apparatus, but with fixed geometry adsorbent beds mounted on displacer pistons, is described below.

FIG. 10

A manually powered air separation apparatus 900 has identical left and right air separation units operating 180 degrees out of phase, and in mechanical balance so as to minimize instantaneous driving force requirements. The apparatus 900 has a left cylinder 901 and a right cylinder 902, containing left and right working spaces whose volumes are changed by reciprocation of left piston 903 and right piston 904 respectively. Left and right cylinders 901 and 902 are mounted in opposition on the same axis 906, supported on a base 905.

Left cylinder 901 has a left displacer piston rod 907, supporting left adsorbent bed 908 which with circumferential piston seal 909 acts as a left displacer piston. Adsorbent bed 908 provides the flow path between left first space 910 and left second space 911. Right cylinder 902 has a right displacer piston rod 917, supporting right adsorbent bed 918 which with circumferential piston seal 919 acts as a right displacer piston. Adsorbent bed 918 provides the flow path between right first space 920 and right second space 921. Purified oxygen is delivered from left second space 911 by left product delivery valve 925, and from right second space 921 by right product delivery valve 926.

Left displacer piston rod 907 is reciprocated by displacer drive yoke 930, connected by lever 932 which is reacted by swing link 933 on fixed pivot 934. Right displacer piston rod 917 is also reciprocated by drive yoke 930, connected by lever 942 which is reacted by swing link 943 on fixed pivot 944. Displacer drive yoke 930 is shifted by drive lever 950 which has semi-rotary travel about pivot 951 on base 905. Drive lever 950 swings through slot 955 in yoke 930. Slot 955 has a left face 956 and a right face 957, impacted alternatingly by left shoulder 958 and right shoulder 959 on drive lever 950. Left shoulder 958 impacts left face 956, and in FIG. 10 right shoulder 959 has impacted right face 957. The separation between left and right faces in slot 955 is such that yoke 930 is shifted each time that drive lever 950 apprachers the limits of its semi-rotary travel. The friction in displacer seals 909 and 919, and displacer piston rod seals 965 and 966, is high enough to prevent motion of the displacer pistons except when a shoulder of drive lever 950 has engaged a face of the drive yoke 930.

Drive lever 950 reciprocates left piston 903 through connecting rod 970 from crank pivot 971 on lever 950, and reciprocates right piston 904 through connecting rod 975 from crank pivot 976 on lever 950. Pivot 951 is located approximately on axis 906, so that the right connecting rod 975 is roughly parallel with the axis 906 when right piston 904 as shown is near top dead center (approaching minimum volume and maximum pressure in the working space of that piston). However, left piston 903 is near its bottom dead centre (approaching maximum volume and minimum pressure in the left working space), and its connecting rod 970 is steeply inclined to axis 906. The depicted geometry of drive lever 950 and the connecting rods thus provides a toggle linkage, in which large volume and low pressure in either cylinder corresponds to greater inclination of the connecting rod, and a greater moment arm of the piston against the lever (compensating the low pressure). Conversely, small volume and high pressure in either cylinder corresponds to a shallow inclination of the connecting rod, and a small to vanishing moment arm of the piston against the lever (compensating the high pressure). Thus, the opposed high pressure and low pressure cylinders may each exert roughly constant opposed torques on the lever, whose necessary driving forces are thus low at all times owing to approximate balance of the cylinders. The described linkage is means to substantially balance mechanical forces between the reciprocating drive means of two apparatuses cycling in opposite phase.

Figure 10:
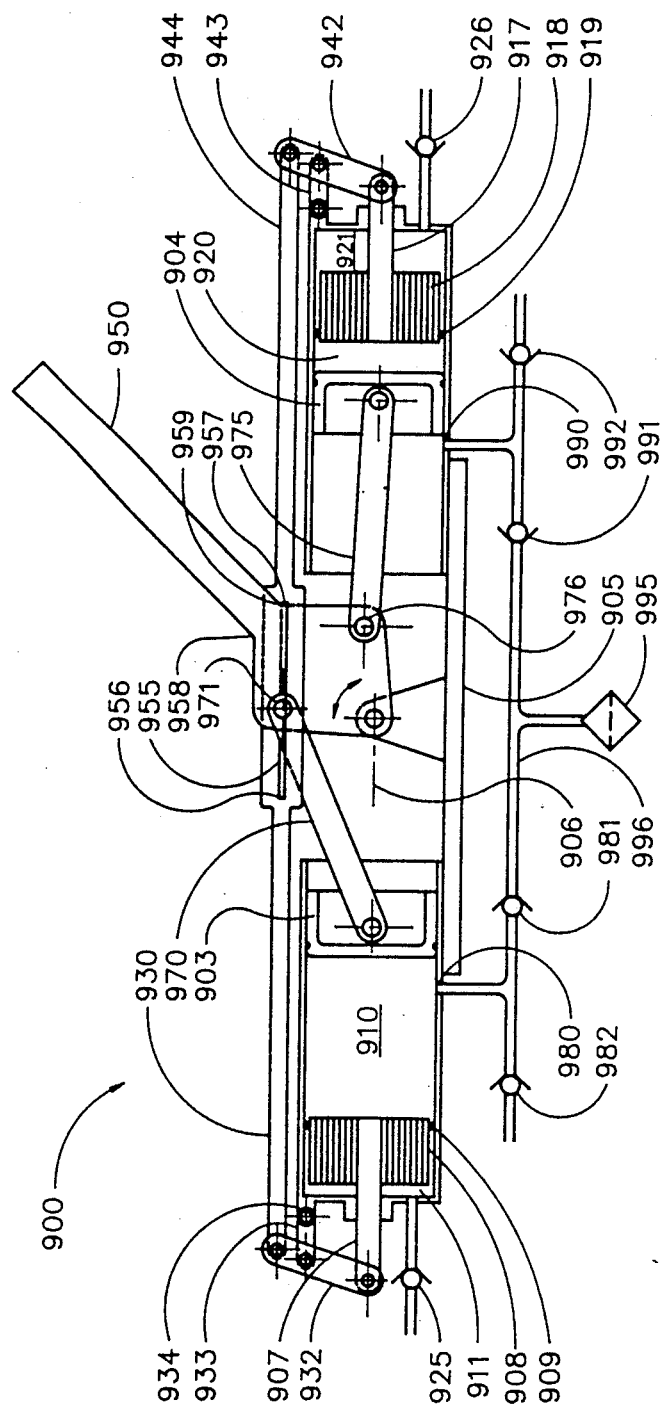
FIG. 10 shows a manually operated air separation apparatus.

The above principle of balancing mechanical forces between opposed pistons of two apparatuses as shown in FIG. 10 is expressed more generally as follows. First and second adsorbent beds 908 and 919 are contained respectively within first and second workiong spaces whose volumes are changed by first and second cyclic volume displacement means (pistons 903 and 904). Flow in the flow path of each adsorbent bed is generated by a displacer piston within the same working space. The first and second cyclic volume displacement means are driven by interconnected first and second reciprocating drive means (connecting rods 970 and 975) cycling at the same cyclic frequency but in opposite phase. Each of the first and second cyclic volume displacement means is subject to a pressure difference between external atmospheric pressure and the working pressure inside the corresponding working space. In the example of FIG. 10, the pistons 903 and 904 are subject to a pressure difference between external atmospheric pressure on one side of the piston, and a working pressure in a first space on the other side of the piston. Means are provided to coordinate the first and second reciprocating drive means, so that the rate of volume change by one of the first and second cyclic volume displacement means is reduced as its pressure difference is increased, and is increased as its pressure difference is decreased. The linkage of FIG. 10 exemplifies such means; and indeed piston 904 which (in the postion shown) is subjected to a large pressure difference will in response to action of drive lever 950 change its working space volume slowly, relative to piston 903 which (in the position shown) is under a small pressure difference and will move relatively rapidly to change its working space more rapidly.

Through interconnection of the first and second cyclic volume displacement drive means, and coordination of their opposed action so that each cyclic volume displacement means moves more slowly when subject to a higher pressure difference, and more rapidly when subject to a lower pressure difference, energy is exchanged between the interconnected reciprocating drive means. Approximate balancing of power demand is approached so as to minimize instantaneous total power demand. This power balancing principle may be expressed through other piston drive mechanisms, for example linkages coupled to a rotating crank drive rather than a semi-rotary lever, or a hydrostatic transmission driving the pistons, in each case moving the piston more heavily loaded by a larger pressure difference more slowly than a less heavily loaded piston with a smaller pressure difference.

Left cylinder 901 is penetrated by left feed/exhaust port 980 which is shown uncovered by left piston 903 so that left feed supply valve 981 and left exhaust valve 982 communicate through open port 980 to the left first space 910. Right cylinder 902 is penetrated by right feed/exhaust port 990 which has been covered by right piston 904 (moving rightward), so that the right first space 920 is not communicating with right feed supply valve 991 and right exhaust valve 992 which are connected to port 990. The feed supply valves and exhaust valves are non-return valves, and the feed supply valves receive feed air from feed filter 995 and feed manifold 996. In this simple apparatus, the portions of the adsorbent beds adjacent the first spaces may be configured so that feed filter 995 is not required. Then manifold 996 and non-return valves 981, 982, 991 and 992 may all be eliminated; and ports 980 and 990 cooperating with pistons 903 and 904 will serve as feed supply valve and exhaust valve sequentially. The piston (having expanded its working space to uncover a port now communicating with the first space) continues to expand the cylinder to its maximum volume while drawing in feed air through the open port acting as feed supply valve, and then reverses from bottom dead center to contract the working space. As the working space contracts, while the port acting as exhaust valve remains open, the piston expels some oxygen depleted air that may be mixed with some feed air, until the piston closes the port 980 or 990 and compresses the air remaining in the working space.

Careful design of the ports and the geometry of the pistons in the first spaces (as well known in the design of two-stroke internal combustion engines) will minimize mixing of fresh air that has just been inducted with oxygen depleted air that is about to be expelled, although some mixing is unavoidable.

The described action of the pistons while the ports are open will provide exchange of depleted air for feed air, restricting the amount of mixing before a substantial portion of the depleted air is exhausted. The position of the ports 980 and 990 in their cylinders will determine the fraction of the cylinder volume that is swept by the pistons while the ports are open. Lacking a feed pump as provided in the apparatus 800 of FIG. 9, apparatus 900 will need this fraction to be substantial (in the order of 25% or more) in order to achieve an adequate exchange of depleted air for fresh feed air. The portion of the absorbent beds adjacent the first spaces would need to contain alumina or other dessicant to protect the zeolite adsorbent in the rest of the flow path from deactivation by water vapour or condensate.

In the position of apparatus 900 as shown, drive lever 950 is moving rightward, and has nearly completed the rightward stroke which has increased the pressure in the right cylinder to the higher second pressure, and decreased the pressure in the left cylinder to the atmospheric first pressure. It will be seen that the engagement of right shoulder 959 with right face 957 is shifting displacer drive yoke 930 rightward, so that the displacer pistons shift leftward. This motion of the displacer pistons will generate flow in the right adsorbent bed in the first direction from the right first space 920 to the right second space 921 (at the second pressure), and will generate purge flow in the left adsorbent bed in the second direction from the left second space 911 to the left first space 910.

In the apparatus of FIGS. 9 and 10, the first space is itself a valved chamber cooperating with the feed supply means and exhaust means to achieve substantial removal of depleted feed gas before it mixes with feed gas mixture which will be introduced to the adsorbent bed. The exchange of feed for depleted gas mixture is enhanced by pump means generating excess feed flow from the feed supply means through the first space and directly out through the exhaust means, as described for FIG. 9.

The features of the invention as expressed in the described embodiments may be expressed in many other combinations and mechanical configurations, under the princples set forth in the following claims.

I claim

1. A process for concentrating a first component from a feed gas mixture containing the first component and a second component, so that the feed gas mixture is separated into a product gas enriched in the first component and a depleted gas mixture enriched in the second component and depleted in the first component; one of the first and second components being more readily adsorbed under increase of pressure relative to the other component which is less readily adsorbed under increase of pressure over an adsorbent material, such that a mixture of the first and second components contacting the adsorbent material is relatively depleted in the first component at a first pressure and is relatively enriched in the first component at a second pressure when the pressure is cycled between the first pressure and the second pressure at a cyclic frequency; providing for the process a flow path through an adsorbent bed of the adsorbent material within a working space, the flow path contacting the adsorbent material between first and second ends of the flow path; and the process including the cyclically repeated steps in some sequence of:

(a) introducing the feed gas mixture to adjacent the first end of the flow path through the adsorbent bed.

(b) changing the volume of the working space communicating with the flow path, so as to change the working pressure over the adsorbent material between the first pressure and the second pressure, (c) while the working pressure is substantially at the second pressure, and the gas mixture contacting the adsorbent material is thus relatively enriched in the first component, generating flow of the feed gas mixture into the flow path through the adsorbent bed from the first end of the flow path, so that the gas mixture flows along the flow path in a first direction from the first end toward the second end of the flow path; and expanding the volume of a second space communicating with the second end of the flow path so as to store within the second space some gas enriched in the first component that has flowed from the second end of the flow path, (d) withdrawing from adjacent the second end of the flow path some product gas enriched in the first component which has flowed out of the adsorbent bed at the second end of the flow path, (e) changing the volume of the working space so as to change the working pressure from substantially the second pressure to substantially the first pressure, (f) while the working pressure is substantially at the first pressure, and the gas mixture contacting the adsorbent bed is thus relatively depleted in the first component, contracting the volume of the second space so as to generate flow along the flow path in a second direction reverse to the first direction, so that gas that was enriched in the first component and stored in the second portion of the working space in step (c) flows into the adsorbent bed at the second end of the flow path to purge the adsorbent bed, while a depleted gas mixture which is depleted in the first component relative to the feed gas mixture flows out of the adsorbent bed at the first end of the flow path, (g) removing from adjacent the first end of the flow path space a fraction in the range of about 20% up to 100% of the depleted gas mixture that has flowed from the adsorbent bed at the first end of the flow path in step (f) above, so as to limit mixing of gas enriched in the second component with the feed gas mixture to be introduced in a subsequent step (a) of the next cycle, and correspondingly to limit the concentration of the second component in the first end of the flow path, (h) exhausting some gas enriched in the second component from the working space, (i) changing the volume of the working space so as to change the working pressure from substantially the second pressure to substantially the first pressure, (j) repeating the above steps cyclically at the cyclic frequency.

2. The process of claim 1, further performing steps (c) and (d) concurrently, so the gas enriched in the first component is withdrawn from the working space at substantially the first pressure.

3. The process of claim 1, further performing step (a) after step (b) and concurrently with step (c), thus introducing the feed gas mixture into the working space at substantially the second pressure, and introducing the feed gas mixture so as to contribute to generating flow along the flow path in the first direction during step (c).

4. The process of claim 3, further performing step (d) concurrently with step (c), so that the amount of feed gas mixture introduced into the first portion of the working space determines the amount of product gas that is withdrawn simultaneously from the second portion of the working space.

5. The process of claim 1, further exhausting in step (h) substantially the entire fraction of depleted gas mixture removed from the first portion of the working space in step (g).

6. The process of claim 5, further performing steps (f), (g) and (h) concurrently, thus exhausting gas mixture depleted in the first component when the working pressure is substantially the second pressure.

7. The process of claim 5, further performing step (h) after step (i), thus exhausting gas mixture depleted in the first component when the working pressure is substantially the first pressure.

8. The process of claim 5, further exhausting in step (h) a fraction of the depleted gas mixture greater than about 50% of the depleted gas mixture that flows out of the adsorbent bed at the first end of the flow path in step (f).

9. The process of claim 8, further exhausting from the working space in step (h) substantially all of the depleted gas mixture that has flowed from the first end of the flow path.

10. The process of claim 1, while also approximately maintaining the temperature of the first end of the flow path at a first temperature, and approximately maintaining the temperature of the second end of the flow path at a second temperature.

11. The process of claim 1, further performing volume changes of steps (b), (e) and (h) in part within a first space communicating with the first end of the flow path.

12. The process of claim 11, further coordinating volume changes performed in the first space with volume changes performed in the second space so that the flow in the flow path will be zero at an intermediate point between the first and second ends of the flow path while the working pressure is changing.

13. The process of claim 11, further performing step (h) after step (i), and concurrently with step (a) of the following cycle.

14. The process of claim 13, further introducing excess feed gas mixture so as to expel some depleted gas mixture from the first space.

15. The process of claim 11, further performing step (h) at a working presure by contracting the volume of the first space, and performing step (a) of the next cycle at the same pressure by expanding the volume of the first space.

16. The process of claim 1, further changing the volume of intermediate spaces communicating with intermediate portions of the flow path during steps (b), (e) and (h); so that the volume of the intermediate spaces is expanded when the pressure is higher and contracted when the pressure is lower.

17. The process of claim 1, further maintaining substantial uniformity of the gas flow in the second space, the flow velocity in the second space relative to the adsorbent bed being kept substantially uniform in the dimension transverse to the direction of the flow within the second space relative to the adsorbent bed, so as to stratify the gas in the second space according to composition at the time of entry from the second end of the flow path through the adsorbent bed, and thus to improve the effectiveness of purging the adsorbent bed during step (f).

18. The process of claim 1, in which the second component is a more readily adsorbed component relative to the first component which is a less readily adsorbed component, and the process is further characterized by maintaining the second pressure higher than the first pressure, thus reducing the volume of the working space in step (i) so as to increase the working pressure, and increasing the volume of the working space in step (e) so as to decrease the working pressure.

19. The process of claim 1, in which the first component is a more readily adsorbed component relative to the second component which is a less readily adsorbed component, and the process is further characterized by maintaining the first pressure higher than the second pressure, thus increasing the volume of the working space in step (i) so as to decrease the working pressure, and reducing the volume of the working space in step (e) so as to increase the working pressure.

20. The process of claim 18, further recovering energy as work of expansion from a step (b) in which the working pressure is being reduced between the first and second pressures, and providing this energy as work of compression to another step (b) in which the working pressure is being increased.

21. The process of claim 1, further characterized by providing a second adsorbent bed within the working space, with a second flow path through the second adsorbent bed having a first end communicating with the first end of the flow path through the first adsorbent bed; and during step (b) changing the total volume of the working space by changing the volumes of a first space communicating with the first end of the flow path, the second space communicating with the second end of the flow path through the first adsorbent bed, and a third space communicating with the second end of the second flow path through the second adsorbent bed; and during step (f) expanding the volume of the third space to generate flow in the second flow path so that the gas depleted in the first component is removed from the first adsorbent bed into the second adsorbent bed during step (g) concurrent with step (f), while gas enriched in the second component is stored in the third space; and during step (c) contracting the volume of the third space to generate flow in the second flow path directed back to the first adsorbent bed, so that gas relatively enriched in the first component flows from the second adsorbent bed to the first end of the flow path; and in step (h) exhausting out of the working space a second product gas enriched in the second component from adjacent the second end of the second flow path.

22. The process of claim 1, further performing the volume changes of step (b) within both the second space and a chamber then communicating with the first end of the flow path; inducting feed gas mixture at a feed pressure into the chamber, and subsequently delivering the feed gas mixture from the chamber into the first end of the flow path; but substantially preventing depleted gas mixture from flowing into the chamber from the first end of the flow path.

23. The process of claim 1, further performing the volume changes of a step (b) within both the second space and a chamber then communicating with the first end of the flow path; permitting depleted gas mixture to flow into the chamber from the first end of the flow path, and subsequently discharging the depleted gas mixture from the chamber; but substantially preventing flow of the depleted gas mixture from the chamber into the first end of the flow path.

24. The process of claim 22, in which flow of depleted gas mixture from the first end of the flow path into the said chamber is prevented by closing communication between the chamber and the first end of the flow path, while the volume of the chamber is being expanded during steps (e) and (f).

25. The process of claim 22, further coordinating the volume changes performed in the second space and in the said chamber so as to prevent flow of depleted gas mixture from the second end of the flow path into the chamber during steps (e) and (f), while the chamber and the first end of the flow path remain in communication.

26. The process of claim 22, further characterized by closing communication of the chamber which has been communicating during a cycle of the process with the first end of the flow path, when the flow adjacent the first end of the flow path reverses direction after the chamber is filled with depleted gas mixture which has flowed from the first end of the flow path; and then during the next cycle of the process opening communication between the first end of the flow path and a second chamber which was filled with feed gas mixture while the first chamber was communicating with the first end of the flow path, contracting the first chamber to discharge the depleted gas mixture, and then expanding the first chamber to fill it with feed gas mixture; during alternating cycles connecting one of the first or second chambers to the first end of the flow path while the other chamber has been disconnected and is discharging depleted gas mixture and then filling with feed gas mixture; and cyclically changing the volumes of the first and second chambers at the same frequency and approximately the same amplitude and phase.

27. Apparatus for concentrating a first component from a feed gas mixture containing the first component and a second component, and separating the feed gas mixture into a product gas enriched in the first component and a depleted gas mixture enriched in the second component and depleted in the first component; one of the first and second components being more readily adsorbed under increase of pressure relative to the other component which is less readily adsorbed under increase of pressure over an adsorbent material, such that a mixture of the first and second components contacting the adsorbent material is relatively depleted in the first component at a first pressure and is relatively enriched in the first component at a second pressure when the pressure is cycled between the first pressure and the second pressure at a cyclic frequency; and the apparatus including:

(a) an adsorbent bed of the adsorbent material within a working space, the adsorbent bed having a flow path through the adsorbent material, and the flow path contacting the adsorbent material between first and second ends of the flow path, (b) feed supply means for introducing the feed gas mixture to adjacent the first end of the flow path, (c) product delivery means for withdrawing the product gas from adjacent the second end of the flow path, (d) exhaust means for exhausting the depleted gas mixture from the apparatus, (e) a second space within the working space communicating with the second end of the flow path, (f) cyclic volume displacement means for cyclically changing the volume of the working space at the cyclic frequency, so as to change the working pressure in the flow path cyclically between the first pressure and the second pressure, (g) means to generate flow in the flow path in a first direction from the first end to the second end of the flow path, when the working pressure is substantially the second pressure, so that gas enriched in the first component will flow out of the adsorbent bed from the second end of the flow path, (h) means to generate flow in the flow path in a second direction reverse to the first direction, when the working pressure is substantially the first pressure, so that depleted gas mixture will flow out of the adsorbent bed from the first end of the flow path, (i) means to change the volume of the second space at the cyclic frequency, so that the volume of the second space is expanding when the pressure is substantially the second pressure, and the volume of the second space is contracting when the pressure is substantially the first pressure, (j) means to exchange depleted gas mixture for feed gas mixture, so as to restrict reintroduction of the depleted gas mixture to the flow path, (k) means to restrict mixing of depleted gas mixture about to be exhausted with feed gas mixture that will be introduced to the flow path.

28. The apparatus of claim 27, in which the feed supply means includes a feed supply valve communicating with the first end of the flow path, the product delivery means includes a product delivery valve communicating with the second end of the flow path, and the exhaust means includes an exhaust valve communicating with the first end of the flow path.

29. The apparatus of claim 28, in which the feed supply means includes means to induct the feed gas mixture at a feed pressure, and deliver the feed gas mixture to the feed supply valve at substantially the second pressure while generating flow in the flow path in the first direction.

30. The apparatus of claim 29, with compressor means to establish the second pressure greater than the feed pressure.

31. The apparatus of claim 29, in which the feed supply means includes a valved chamber with means to change the volume of the said chamber at the cyclic frequency, so as to change the pressure of feed gas mixture that has been inducted at the feed pressure to substantially the second pressure, the valved chamber delivering feed gas mixture to the first end of the flow path through the feed supply valve when the feed supply valve is open.

32. The apparatus of claim 28, in which the exhaust means includes means to accept depleted gas mixture at substantially the first pressure from adjacent the first end of the flow path, while generating flow in the second direction in the flow path, and discharge the depleted gas mixture at a discharge pressure.

33. The apparatus of claim 32, in which the exhaust means includes an expander as means to establish the first presssure greater than the discharge pressure.

34. The apparatus of claim 32, in which the exhaust means includes a vacuum pump as means to establish a subatmospheric first pressure below an approximately atmospheric exhaust pressure.

35. The apparatus of claim 32, in which the exhaust means includes a valved chamber with means to vary the volume of the chamber, so as to accept depleted gas mixture from adjacent the first end of the flow path when the exhaust valve is open, and to discharge the depleted gas mixture when the exhaust valve is closed.

36. The apparatus of claim 27, in which the cyclic volume displacement means for changing the volume of the working space so as to change the working pressure is the means for cyclically changing the volume of the second space.

37. The apparatus of claim 27, in which the cyclic volume displacement means for changing the volume of the working space includes a first cyclic volume displacement means changing at the cyclic frequency the volume of a first space communicating with the first end of the flow path, and a second cyclic volume displacement means changing the volume of the second space at the cyclic frequency.

38. The apparatus of claim 37, in which the first component is more readily adsorbed that the second component, with means to establish the first pressure higher than the second pressure, and means to establish cooperation between the first and second volume displacement means so that cyclic volume changes in the first space have a leading phase relative to cyclic volume changes in the second space.

39. The apparatus of claim 37, in which the second component is more readily adsorbed than the first component, with means to establish the first pressure lower than the second pressure, and means to establish cooperation between the first and second cyclic volume displacement means so that cyclic volume changes in the second space have a leading phase relative to cyclic volume changes in the first space.

40. The apparatus of claim 37, in which the adsorbent bed is mounted on a moving displacer piston within a cylinder, the displacer piston separating first and second spaces in the cylinder, and the adsorbent bed providing a flow path between the first and second spaces.

41. The apparatus of claim 39, with means for cooperation of the feed supply valve and exhaust valve with the cyclic volume displacement means, so that while the feed supply valve is open and the working pressure is substantially the first pressure, the cyclic volume displacement means expands the volume of the working space to induct feed gas mixture through the feed supply valve which is then open, and then while the working pressure is still substantially the first pressure, the cyclic volume displacement means contracts the volume of the working space so as to expel primarily the depleted gas mixture through the exhaust valve which is then open.

42. The apparatus of claim 41, with means to open both the feed supply valve and exhaust valve while the working pressure is substantially the first pressure, and with pump means communicating with the feed supply valve to generate excess flow of feed gas through the feed supply valve so as to flush depleted gas mixture from the first space.

43. The apparatus of claim 41, with means for cooperation of the feed supply valve and exhaust valve with the cyclic volume displacement means, so that while the exhaust valve is open and the working pressure is substantially the second pressure, the cyclic volume displacement means contracts the volume of the working space so as to expel depleted gas mixture through the exhaust valve which is then open, and then while the working pressure is still substantially the second pressure, the cyclic volume displacement means expands the volume of the working space so as to induct feed gas mixture through the feed supply valve which is then open.

44. The apparatus of claim 43, with means to maintain open both the feed supply valve and exhaust valve when the working pressure is substantially the second pressure, and pump means is provided to generate excess flow of feed gas mixture through the feed supply valve so as to flush depleted gas mixture from the first space.

45. The apparatus of claim 27 with flow distribution means to establish substantial transverse uniformity of flow in the second space, so as to maintain the instantaneous flow velocity relative to the adsorbent bed approximately uniform across the dimension of the second space transverse to the direction of flow in the second space relative to the adsorbent bed, so as to establish substantial stratification of gas in the second space according to the sequence of entry from the adsorbent bed, and thus to improve the effectiveness of the purge step and the purity of the product.

46. The apparatus of claim 27, in which:
(a) the feed supply means and exhaust means include first and second chambers with valve means interposed between the first and second chambers and the first end of the flow path through the adsorbent bed,
(b) means to change the volumes of the first and second chambers at the cyclic frequency with substantially the same amplitude and phase,
(c) means to coordinate the said valve means such that during alternating cycles one of the first and second chambers communicates through the valve means with the first end of the flow path to deliver feed gas mixture to the adsorbent bed and receive depleted feed gas from the adsorbent bed, while the other chamber is disconnected from the adsorbent bed to discharge depleted gas mixture and induct feed gas mixture,
(d) means to operate the valve means at half the cyclic frequency to exchange the first and second chambers communicating with the adsorbent bed once per cycle of the chambers, preferably exchanging the chambers when the volume of the chambers is substantially maximum and the flow velocity at the first end of the flow path os changing direction through zero flow, so that substantially all of the depleted gas mixture can be discharged from the apparatus with minimal mixing of depleted gas mixture into incoming feed gas mixture.

47. The apparatus of claim 27 in combination with a second similar apparatus, the combined apparatus including a first apparatus and a second apparatus each as described in claim 27, and including means to coordinate operation of the first and second apparatuses cycling in opposite phase; the combined apparatus including a first adsorbent bed within a first working space, and a second adsorbent bed within a second working space, a first displacer as means to generate flow in the flow path of the first adsorbent bed, and a second displacer as means to generate flow in the flow path of the second adsorbent bed; the combined apparatus further including a first cyclic volume displacement means as means for cyclically changing the volume of the first working space and a second cyclic volume displacement means as means for cyclically changing the volume of the second working space; and interconnected reciprocating drive means is provided to drive the first and second cyclic volume displacement means at the same cyclic frequency and in opposite phase; the apparatus further characterized by means to coordinate the volume changes in the first and second working spaces so that the volume of either working space is changed relatively rapidly when the pressure difference between the working pressure in that working space and the external pressure contacting the reciprocating drive means is relatively small, and the volume of either working space is changed relatively slowly when the pressure difference between the working pressure in that working space and the external pressure is relatively large; so that energy is exchanged between the first and second cyclic volume displacement means through the interconnected reciprocating drive means thus improving efficiency of operation, and the mechanical power between the first and second cyclic volume displacement means is partially balanced to reduce peak instantaneous power demand of the drive means.

48. The apparatus of claim 47, in which the volume of each working space is primarily changed by the corresponding cyclic volume displacement means and at most only slightly changed by reciprocation of the corresponding displacer means, and with means to coordinate the motion of the displacers with the reciprocating drive means so as to generate flow in the flow paths through the adsorbent beds when the volume of one working space is relatively increased and the volume of the other working space is relatively reduced.

49. The apparatus of claim 47, in which the means to coordinate the volume changes in the first and second working spaces is provided as a toggle linkage, said linkage including a semi-rotary drive lever connected to the first and second cyclic volume displacement means by respectively first and second connecting rods, so that the moment arm of the drive lever against either cyclic volume displacement means is relatively greater when the pressure difference between the external pressure and the working pressure of the corresponding working space is relatively small, and the moment arm is relatively smaller when the pressure difference is relatively large, so as to reduce unbalanced torque on the drive lever.

50. The apparatus of claim 49, with means to shift the displacer pistons in response to the approach of the semi-rotary drive lever to either limit of its travel, so that flow is generated by the displacer pistons in the flow path through the adsorbent beds when the working pressure in one working space is substantially increased, and the working pressure in the other working space is substantially reduced.

51. Apparatus for separating a more readily adsorbed component and a less readily adsorbed component from a gas mixture; the apparatus including a first cyclic volume displacement means communicating with first and second adsorbent beds and also communicating with feed supply means to introduce the gas mixture to the adsorbent beds adjacent the first cyclic volume displacement means; with a flow path through the first adsorbent bed connecting the first cyclic volume displacement means to a second cyclic volume displacement means, and a flow path through the second adsorbent bed connecting the first cyclic volume displacement means to a third cyclic volume displacement means; the apparatus having product delivery valve means connected to each of the second and third cyclic volume displacement means; and the apparatus having drive means so that the three cyclic volume displacement means cycle at the same frequency and with relative phase so that the flow through the adsorbent beds is directed toward the second cyclic volume displacement means when the pressure is relatively elevated, and the flow through the adsorbent beds is directed toward the third cyclic volume displacement means when the pressure is relatively lowered; so that gas enriched in the first component is withdrawn form the product delivery valve adjacent the second cyclic volume displacement means, while gas enriched in the second component is withdrawn from the product delivery valve adjacent the third cyclic volume displacement means.

52. Apparatus for separating a product gas substantially purified in a first component from a feed gas mixture containing the first component and a second component; one of the first and second components being more readily adsorbed under increase of pressure relative to the other component which is less readily adsorbed under increase of pressure over an adasorbent material under the working conditions of the apparatus; the apparatus enclosing a working space including a flow path through an adsorbent bed of the adsorbent material, and the working space including a second space communicating with one end of the flow path; the apparatus including cyclic volume displacement means to change the total volume of the working space and thus to change the working pressure within the working space at a cyclic frequency, and also to change the volume of the second space at the same frequency; the apparatus further including means to generate flow in the flow path with the direction of flow reversing at the cyclic frequency and with a phase relation to the changes of working pressure, so as to provide in one part of the cycle flow enriched in the first component directed into the second space from the adsorbent bed during part of the cycle, and in a subsequent part of the cycle flow in the opposite direction from the second space back into the flow path in order to purge the adsorbent bed of gas enriched in the second component; the apparatus further characterized by:

(a) flow distribution means cooperating with the adsorbent bed and the second space to maintain within the second space substantial uniformity of the instantaneous flow velocity relative to the adsorbent bed in the transverse dimension to the flow direction, so as to establish substantial stratification of gas in the second space according to the time of entry from the adsorbent bed, in order to improve the effectiveness of the purge step and thus improve the purity of the product.

53. The apparatus of claim 52, in which the means to generate flow in the flow path includes a reciprocating displacer piston in a displacer cylinder within the working space, the adsorbent bed is installed within the displacer piston with a plurality of narrow and substantially identical parallel passages through the displacer piston and parallel to its reciprocating axis supporting the adsorbent material, the parallel passages through the displacer piston constituting the flow path and communicating at one end to a chamber in the displacer cylinder which is the second space, so that reciprocation of the displacer piston at the cyclic frequency generates flow in the flow path; the parallel passages in the displacer piston being dispersed substantially uniformly across its cross section transverse to its reciprocating axis so that the instantaneous flow velocity in the second space relative to the adsorbent bed is substantially uniform transverse to the flow direction.

54. The apparatus of claim 53, in which the parallel passages supporting the adsorbent are provided by honeycomb monoliths.

55. The apparatus of claim 53, in which the parallel passages are provided as gaps defined by spacer means between adjacent layers of a spirally wound ribbon of sheet material supporting the adsorbent material.

56. The apparatus of claim 55, in which the ribbon of sheet material is wound as a spiral roll around a displacer piston rod means by which the displacer piston is reciprocated.

57. Apparatus for separating first and second components of a gas mixture, one of the first and second components being more readily adsorbed under increase of pressure relative to the other component which is less readily adsorbed under increase of pressure over an adsorbent material under the operating conditions of the apparatus; the apparatus including an adsorbent bed of the adsorbent material with a flow path through the adsorbent bed; the apparatus further including means to introduce the gas mixture to the flow path, means to generate cyclic flow in the flow path with the direction of flow reversing at a cyclic frequency, and means to generate cyclic pressure variations of the gas in the flow path at the cyclic frequency and with phase coordinated so that the pressure is relatively increased when the gas is flowing in a first direction in the flow path through the adsorbent bed, and the pressure is relatively decreased when the gas is flowing in the reverse direction in the flow path; the apparatus further characterized as follows:

(a) the flow path comprises a plurality of narrow and substantially identical parallel passages, said passages being provided as gaps defined by spacer means between adjacent layers of a spirally wound ribbon of sheet material on which the adsorbent material is supported.

58. Apparatus for separating a gas mixture including a first component and a second component, one of the first and second components being more readily adsorbed under increase of pressure relative to the other component which is less readily adsorbed under increase of pressure over an adsorbent material under the working conditions of the apparatus; the apparatus including first and second working spaces respectively enclosing first and second adsorbent beds of the adsorbent material, means to generate cyclically reversing flow at a cyclic frequency in a flow path through each adsorbent bed, first and second cyclic volume displacement means respectively communicating with the first and second working spaces so as to change the volumes thereof, and drive means cooperating with the first and second cyclic volume displacement means and the means to generate cyclically reversing flow in the flow paths so that the cyclic volume displacement means are cyclically actuated in opposite phase; the drive means further characterized by:

(a) means to exchange energy between the first and second cyclic volume displacement means, so that work of compression to reduce the volume of one working space is in part provided by the work of expansion to increase the volume of the other working space, (b) means to change the volume of each working space relatively rapidly when the pressure difference between the working pressure in that working space and the external pressure contacting the drive means is relatively small, and to change the volume of each working space relatively slowly when the pressure difference between the working pressure and the external pressure is relatively large, so as to reduce peak power demand of the drive means by approximately balancing power between the first and second cyclic volume displacement means.

59. The apparatus of claim 58, in which the means to generate cyclically reversing flow in the flow path of each adsorbent bed is provided as a first and second displacer communicating with both ends of the flow paths in respectively the first and second adsorbent beds, the displacers characterized as generating at most small changes in the volume of each working space compared to the relatively large changes in volume of each working space generated by the corresponding cyclic volume displacement means; and with means to actuate the displacers to generate flow in the flow paths when the pressure in one working space is relatively increased and the pressure in the other working space is reduced.

* * * * *